US007899664B2

(12) United States Patent
Ishikura et al.

(10) Patent No.: US 7,899,664 B2
(45) Date of Patent: Mar. 1, 2011

(54) INFORMATION PROCESSING APPARATUS, COMPUTER, INFORMATION PROCESSING SYSTEM, INFORMATION PROCESSING METHOD, AND PROGRAM FOR RECEIVING A CHARACTER STRING AND RETURNING CONVERSION CANDIDATES

(75) Inventors: Hiroyuki Ishikura, Nara (JP); Naoki Kodama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 957 days.

(21) Appl. No.: 11/804,666

(22) Filed: May 17, 2007

(65) Prior Publication Data

US 2007/0294079 A1 Dec. 20, 2007

(30) Foreign Application Priority Data

May 22, 2006 (JP) ................. 2006-141350
May 22, 2006 (JP) ................. 2006-141354

(51) Int. Cl.
*G06F 17/28* (2006.01)
(52) U.S. Cl. ................. 704/3; 704/2; 704/8; 704/10
(58) Field of Classification Search ................. 704/2, 3, 704/10, 8
See application file for complete search history.

(56) References Cited

U.S. PATENT DOCUMENTS

| 5,870,702 | A | * | 2/1999 | Yamabana | 704/10 |
| 6,282,508 | B1 | | 8/2001 | Kimura et al. | |
| 7,412,374 | B1 | * | 8/2008 | Seiler et al. | 704/8 |
| 2002/0019731 | A1 | * | 2/2002 | Masui et al. | 704/7 |
| 2007/0061131 | A1 | * | 3/2007 | Kida et al. | 704/10 |

FOREIGN PATENT DOCUMENTS

| JP | 07-177272 | 7/1995 |
| JP | 10-260960 | 9/1998 |
| JP | 11-066059 | 3/1999 |
| JP | 2000-099499 | 4/2000 |
| JP | 2002-140295 | 5/2002 |
| JP | 2004-318385 | 11/2004 |
| JP | 2004-334630 | 11/2004 |

* cited by examiner

*Primary Examiner* — Jakieda R Jackson
(74) *Attorney, Agent, or Firm* — David G. Conlin; Steven M. Jensen; Edwards Angell Palmer & Dodge LLP

(57) ABSTRACT

Even in the case of an information processing apparatus different from a computer usually used by a user, the same kana-kanji conversion candidates as the computer are acquired without unifying Japanese-language converting programs and unifying usage environments. The computer comprises a kana-kanji converting portion that receives a character string from an information processing apparatus through a network to return conversion candidates. The apparatus displays the conversion candidates.

27 Claims, 12 Drawing Sheets

INFORMATION PROCESSING APPARATUS, COMPUTER, INFORMATION PROCESSING SYSTEM, INFORMATION PROCESSING METHOD, AND PROGRAM FOR RECEIVING A CHARACTER STRING AND RETURNING CONVERSION CANDIDATES

CROSS-NOTING PARAGRAPH

This Nonprovisional application claims priority under 35 U.S.C. §119 (a) on Patent Applications No. 2006-141350 filed in JAPAN on May 22, 2006 and No. 2006-141354 filed in JAPAN on May 22, 2006, the entire contents of which are hereby incorporated herein by references.

FIELD OF THE INVENTION

The present invention relates to an information processing apparatus, a computer, an information processing system, an information processing method, and a program, and, more particularly, to an information processing apparatus connected through a network to a computer such as a personal computer (PC), workstation, or home computer integrated with a set-top box or TV to perform Japanese-language input, the computer, an information processing system including the information processing apparatus and the computer, an information processing method, and a program to be incorporated into the information processing apparatus or computer.

BACKGROUND OF THE INVENTION

Every information processing apparatus such as multifunction peripherals (MFP), facsimile apparatuses, television receivers, and various recorders recording sound or video/sound can perform kana-kanji conversion of input characters (hiragana and numeric characters) to acquire a desired character string, for example, a name of a transmission destination of an e-mail or facsimile document, a title of a record file, a file name, a folder name, and a user comment. Computers such as PCs and workstations also perform such Japanese-language input to create various data.

On the other hand, in computers such as PCs and workstations used daily by a user, Japanese-language conversion software is customized automatically or through setup such that the Japanese-language input can easily and quickly be performed. This customization is performed by registering a dictionary exclusively used by a user or through automatic learning, and as a result, a better Japanese-language input environment can be provided to the user.

However, when Japanese-language input is performed with an information processing apparatus other than the computer used daily by a user, since the apparatus is not customized for the user, the input is troublesome and may bring discomfort.

In this regard, Japanese Laid-Open Patent Publication No. 2004-318385 discloses that a plurality of terminals connected to a network refers to a common dictionary located in a server or an individual dictionary in a storage medium mounted on the terminal to perform Japanese-language conversion input. This publication also discloses that the individual dictionary is preferentially referenced at the time of Japanese-language input conversion.

Japanese Laid-Open Patent Publication No. 2002-140295 discloses that an environment of PC used once can be established in another PC. Japanese Laid-Open Patent Publication No. 2004-334630 discloses that words are taken out from a text acquired from a server and that data of words not registered in a dictionary are acquired from a server and automatically registered.

However, in the system described in Japanese Laid-Open Patent Publication No. 2004-318385, kana-kanji conversion (Japanese-language conversion) programs of the terminals must be unified to use the same dictionary with the plurality of terminals. That is, although the same kana-kanji conversion environment is achieved for a user in every terminal in this system, it is premised that the plurality of terminals uses the same converting program and the same common dictionary. Therefore, unless such unification is performed, the same Japanese-language conversion candidates cannot be acquired in an information processing apparatus incorporating a Japanese-language converting program different from the Japanese-language converting program (Japanese-language conversion software) of the computer used daily by the user.

In the system described in Japanese Laid-Open Patent Publication No. 2002-140295, since environments are equalized in apparatuses with almost the same specification among PCs and terminals, the usage environments must be adjusted, and the Japanese-language conversion candidates are not matched between different types of apparatus, such as a PC and an information processing apparatus other than the PC.

In the system described in Japanese Laid-Open Patent Publication No. 2004-334630, no consideration is given to matching the kana-kanji conversion environment in a plurality of apparatuses and, for example, different word data are registered even when the same user uses the apparatuses.

SUMMARY OF THE INVENTION

It is an object of the present invention to provide an information processing apparatus that can acquire, even in the case of an information processing apparatus different from a computer usually used by a user, the same kana-kanji conversion candidates as the computer without unifying Japanese-language converting programs and unifying usage environments, an information processing system including the information processing apparatus and the computer, an information processing method, and a program to be incorporated into the information processing apparatus or computer.

In order to achieve the above-mentioned object, a first technical means of the present invention is an information processing apparatus connected to a computer through a network, the computer comprising a computer Japanese-language converting portion that receives a character string from the information processing apparatus through the network to return conversion candidates, the information processing apparatus comprising: a user interface portion that deals with character input from a user and display for a user; a main-body Japanese-language converting portion that receives a character string input from the user interface portion to return conversion candidates; a conversion controlling portion that controls interaction between the user interface portion and the computer Japanese-language converting portion as well as the main-body Japanese-language converting portion; and a computer identifying portion that identifies the computer corresponding to a user currently using the information processing apparatus, the conversion controlling portion sending the character string input with the user interface portion to the computer Japanese-language converting portion of the computer identified by the computer identifying portion or to the computer Japanese-language converting portion and the main-body Japanese-language converting portion for conversion, the conversion controlling portion sending the conversion results, i.e., conversion candidates to the user interface portion for display.

A second technical means is the information processing apparatus as defined in the first technical means, wherein after the conversion controlling portion sends the character string input with the user interface portion to the main-body Japanese-language converting portion for conversion and sends the conversion results, i.e., conversion candidates to the user interface portion for display, the conversion controlling portion sends the character string input with the user interface portion to the computer Japanese-language converting portion through the network for conversion in accordance with a user instruction input from the user interface portion and receives through the network and sends the conversion results, i.e., conversion candidates to the user interface portion for display.

A third technical means is the information processing apparatus as defined in the first technical means, wherein the conversion controlling portion sequentially sends the character string input with the user interface portion through the network to the computer Japanese-language converting portion for conversion each time one character is input and sequentially receives through the network and sends the conversion results, i.e., conversion candidates to the user interface portion for display and wherein when receiving an input character from the information processing apparatus, if the computer Japanese-language converting portion is in process of converting the previously received character string, the converting process is terminated to start the conversion of the character string having added thereto the input character received this time.

A fourth technical means is the information processing apparatus as defined in the first technical means, wherein the conversion controlling portion confirms through the network the operation of the computer Japanese-language converting portion in the computer identified by the computer identifying portion and wherein if the operation of the computer Japanese-language converting portion cannot be confirmed, the conversion controlling portion sends the character string input with the user interface portion only to the main-body Japanese-language converting portion for conversion and sends the conversion results, i.e., conversion candidates to the user interface portion for display.

A fifth technical means is the information processing apparatus as defined in the first technical means, wherein the information processing apparatus and/or the computer comprise the user authenticating portions and wherein in case the user authenticating portion fails to authenticate a user, the conversion controlling portion sends the character string input with the user interface portion only to the main-body Japanese-language converting portion for conversion and sends the conversion results, i.e., conversion candidates to the user interface portion for display.

A sixth technical means is the information processing apparatus as defined in the first technical means, wherein the information processing apparatus and the computer comprise an encryption/decryption processing portion to encrypt the character string and conversion candidates transmitted and received through the network between the information processing apparatus and the computer with the encryption/decryption processing portion on the transmission side and to decrypt the encrypted character string or conversion candidates with the encryption/decryption processing portion on the reception side.

A seventh technical means is an information processing system comprising the information processing apparatus as defined in any one of the first to sixth technical means and the computer connected to the information processing apparatus.

An eighth technical means is an information processing method of performing an information process while an information processing apparatus accesses a computer connected to the information processing apparatus through a network, the method comprising: an input step of accepting character input from a user by a user interface portion of the information processing apparatus; a display step of displaying the character string input at the input step for the user by the user interface portion; a Japanese-language converting step of receiving the character string input at the input step to return conversion candidates by a Japanese-language converting portion of the information processing apparatus; a conversion controlling step of controlling interaction between the user interface portion and the Japanese-language converting portion of the information processing apparatus as well as the Japanese-language converting portion of the computer by a conversion controlling portion; a computer identifying step of identifying the computer corresponding to a user currently using the information processing apparatus by a computer identifying portion; and a computer Japanese-language converting step of receiving the character string from the information processing apparatus through the network to return conversion candidates by the Japanese-language converting portion of the computer, the conversion controlling step being a step of sending the character string input with the user interface portion to the computer Japanese-language converting portion of the computer identified at the computer identifying step or to the computer Japanese-language converting portion and the information processing apparatus Japanese-language converting portion for conversion to send the conversion results, i.e., conversion candidates to the user interface portion for display.

A ninth technical means is a program to be incorporated into an information processing apparatus connected to a computer through a network, the information processing apparatus comprising a user interface portion that deals with character input from a user and display for a user and a controlling portion that controls the user interface portion, the program causing the controlling portion to execute a computer identifying step of identifying the computer corresponding to the user currently using the information processing apparatus; a converting step consisting of a computer Japanese-language converting step of transmitting a character string input with the user interface portion to the identified computer through the network to receive the conversion candidates from the computer or consisting of the computer Japanese-language converting step and an information processing apparatus Japanese-language converting step of receiving the character string input with the user interface portion to return conversion candidates; and a result displaying step of sending to the user interface portion and displaying the conversion candidates that are the conversion result acquired by executing the converting step consisting of the computer Japanese-language converting step or the computer Japanese-language converting step and the information processing apparatus Japanese-language converting step for the character string input with the user interface portion.

A tenth technical means is the program as defined in the ninth technical means, wherein at the converting step, after executing the information processing apparatus Japanese-language converting step to convert the character string input with the user interface portion and to send the conversion results, i.e., conversion candidates to the user interface portion for display, the computer Japanese-language converting step is executed in accordance with a user instruction input from the user interface portion to send the character string input with the user interface portion through the network for conversion and to receive through the network and sends the conversion results, i.e., conversion candidates to the user interface portion for display.

An eleventh technical means is the program as defined in the ninth technical means, wherein at the converting step, the computer Japanese-language converting step is executed to sequentially send the character string input with the user interface portion through the network for conversion each time one character is input and to sequentially receive through the network and send the conversion results, i.e., conversion candidates to the user interface portion for display and wherein at the computer Japanese-language converting step, when receiving an input character from the information processing apparatus, if the computer is in process of converting the previously received character string, the converting process is terminated to start the conversion of the character string having added thereto the input character received this time and the resulting conversion candidates are received from the computer.

A twelfth technical means is the program as defined in any one of the ninth to eleventh technical means, wherein at the converting step, it is confirmed through the network that the computer Japanese-language converting step can be executed in the computer identified at the computer identifying step and wherein if the computer Japanese-language converting step cannot be executed, only the information processing apparatus Japanese-language converting step is executed to send the character string input with the user interface portion for conversion and to send the conversion results, i.e., conversion candidates to the user interface portion for display.

A thirteenth technical means is the program as defined in any one of the ninth to eleventh technical means, wherein the converting step includes a user authenticating step of performing user authentication by the information processing apparatus and/or the computer and wherein in case a user fails to be authenticated at the user authenticating step, only the information processing apparatus Japanese-language converting step is executed to send the character string input with the user interface portion for conversion and to send the conversion results, i.e., conversion candidates to the user interface portion for display.

A fourteenth technical means is a program to be incorporated into a computer connected through a network to the information processing apparatus as defined in any one of the first to sixth technical means, the program causing the computer to execute the step of receiving only the character string input with the information processing apparatus from the information processing apparatus through the network and returning conversion candidates to the information processing apparatus after Japanese-language conversion.

It is another object of the present invention to provide an information processing system that includes an information processing apparatus and a computer and that can create dictionary additional information of kana-kanji conversion for an information processing apparatus even in the case of an information processing apparatus different from a computer usually used by a user such that the same kana-kanji conversion candidates as the computer can be acquired without unifying Japanese-language converting programs and unifying usage environments, the computer, the information processing apparatus, an information processing method, and a program to be incorporated into the information processing apparatus or computer.

In order to achieve the above-mentioned object, a fifteenth technical means of the present invention is an information processing system comprising an information processing apparatus and a computer connected to the information processing apparatus through a network, the information processing apparatus comprising a first Japanese-language converting portion that uses a first normal dictionary and first dictionary additional information to convert characters input through user operation and a controlling portion that performs control of transmitting the first normal dictionary to the computer through the network and control of externally receiving the first dictionary additional information as the response thereto, the computer comprising a second Japanese-language converting portion that uses a second normal dictionary and a second dictionary additional information to convert characters input through user operation, a dictionary additional information generating portion that uses the first normal dictionary and the second dictionary additional information to generate the first dictionary additional information for the first normal dictionary received from the information processing apparatus through the network, and a dictionary additional information output portion that outputs the first dictionary additional information generated by the dictionary additional information generating portion to the outside.

A sixteenth technical means is the information processing system as defined in the fifteenth technical means, wherein the information processing apparatus comprises a storage medium reading portion that reads data from a portable storage medium, wherein the dictionary additional information output portion includes a storage medium writing portion that writes the first dictionary additional information into the storage medium, and wherein the controlling portion performs control of causing the first Japanese-language converting portion to use the first normal dictionary and the first dictionary additional information read from the storage medium with the storage medium reading portion to perform the conversion.

A seventeenth technical means is the information processing system as defined in the fifteenth technical means, wherein the dictionary additional information output portion includes a transmitting portion that transmits the first dictionary additional information through the network to the information processing apparatus that receives the first normal dictionary, and wherein the controlling portion performs control of causing the first Japanese-language converting portion to use the first normal dictionary and the first dictionary additional information transmitted by the transmitting portion to perform the conversion.

An eighteenth technical means is the information processing system as defined in the fifteenth technical means, wherein the first dictionary additional information and the second dictionary additional information are information of registration words and/or learning contents.

A nineteenth technical means is the information processing system as defined in the fifteenth technical means, wherein the information processing apparatus comprises a computer checking portion that checks whether the dictionary additional information generating portion exists in the computer, and wherein only when the dictionary additional information generating portion exists, the controlling portion performs control of transmitting the first normal dictionary to the computer through the network.

A twentieth technical means is the information processing system as defined in the fifteenth technical means, wherein the information processing apparatus comprises a user authenticating portion, wherein the dictionary additional information output portion outputs the first dictionary additional information generated by the dictionary additional information generating portion to the outside along with user information related to a user permitted to use the first dictionary additional information, and wherein only when the user authenticating portion can authenticate the user, the controlling portion performs control of enabling the conversion in the first Japanese-language converting portion with the use of the externally received first dictionary additional information.

A twenty-first technical means is the information processing system as defined in the fifteenth technical means, wherein the information processing apparatus and the computer include an encryption/decryption processing portion respectively, wherein the first normal dictionary transmitted/received between the information processing apparatus and the computer is encrypted by the encryption/decryption processing portion of the information processing apparatus, and wherein the encrypted first normal dictionary is decrypted by the encryption/decryption processing portion of the computer.

A twenty-second technical means is the information processing system as defined in the fifteenth technical means, wherein the computer comprises an erasing portion that erases the first normal dictionary received from the information processing apparatus after the dictionary additional information generating portion generates the first dictionary additional information for the first normal dictionary.

A twenty-third technical means is the information processing system as defined in the fifteenth technical means, wherein the dictionary additional information generating portion requests the information processing apparatus through the network to partially generate the first dictionary additional information, and when the request is received, the controlling portion causes the first Japanese-language converting portion to generate the first dictionary additional information based on data included in the received request.

A twenty-fourth technical means is the information processing system as defined in the fifteenth technical means, wherein the controlling portion performs control of transmitting the current first dictionary additional information to the computer through the network along with the first normal dictionary, and wherein the dictionary additional information generating portion uses the first normal dictionary, the first dictionary additional information, and the second dictionary additional information to generate new first dictionary additional information for the first normal dictionary and the first dictionary additional information received from the information processing apparatus through the network.

A twenty-fifth technical means is a computer included in the information processing system as defined in any one of the fifteenth to twenty-fourth technical means.

A twenty-sixth technical means is an information processing apparatus included in the information processing system as defined in any one of the fifteenth to twenty-fourth technical means.

A twenty-seventh technical means is an information processing method of performing an information process by a computer and an information processing apparatus connected to the computer through a network, the method comprising: a first Japanese-language converting step of using a first normal dictionary and first dictionary additional information to convert characters input through user operation by a Japanese-language converting portion of the information processing apparatus; a step of performing control of transmitting the first normal dictionary to the computer through the network by the controlling portion of the information processing apparatus; a step of performing control of externally receiving the first dictionary additional information as the response thereto by the controlling portion; a second Japanese-language converting step of using a second normal dictionary and second dictionary additional information to convert characters input through user operation by the Japanese-language converting portion of the computer; a dictionary additional information generating step of using the first normal dictionary and the second dictionary additional information by a dictionary additional information generating portion to generate the first dictionary additional information for the first normal dictionary received from the information processing apparatus through the network; and a dictionary additional information output step of outputting the generated first dictionary additional information to the outside by a dictionary additional information output portion.

A twenty-eighth technical means is a program to be incorporated into a computer connected to an information processing apparatus through a network, the computer comprising a Japanese-language converting portion that uses a normal dictionary and dictionary additional information to convert characters input through user operation, the program causing the computer to execute a step of receiving the normal dictionary of the information processing apparatus through the network from the information processing apparatus; a dictionary additional information generating step of using the normal dictionary of the information processing apparatus and the dictionary additional information of the computer to generate the dictionary additional information of the information processing apparatus; and a dictionary additional information output step of outputting the generated dictionary additional information of the information processing apparatus to the outside.

A twenty-ninth technical means is a program to be incorporated into an information processing apparatus connected to a computer through a network, the information processing apparatus comprising a Japanese-language converting portion that uses a normal dictionary and dictionary additional information to convert characters input through user operation, the program causing the information processing apparatus to execute the steps of: performing control of transmitting the normal dictionary to the computer through the network; performing control of externally receiving the dictionary additional information as the response thereto; and controlling the Japanese-language converting portion to perform the conversion with the use of the normal dictionary and the received dictionary additional information.

PREFERRED EMBODIMENTS OF THE INVENTION

An information processing apparatus according to the present invention acquires Japanese-language conversion candidates from a computer while being connected through a network to the computer (not limited to the fixed/portable type) such as PC or workstation usually used by a user, and an information processing system including the information processing apparatus and the computer will hereinafter be described. Although a PC is shown as an example of the computer, the present invention is also applicable to other computers such as a workstation or home computer integrated with a set-top box or TV. This information processing system is a Japanese-language input system that can acquire candidates corresponding to a user using the system even in an environment with a plurality of PCs connected to one information processing apparatus. Of course, in a system configuration, one information processing apparatus may be connected to only one PC or a plurality of PCs where candidates are acquired, or a plurality of such information processing apparatuses may be connected (in this case, of course, the information processing apparatuses are permitted to overlap to acquire candidates from a PC). The information processing apparatus must be network-connectable and generally uses a plurality of PCs (PCs usually used by each user) as host apparatuses to perform a kana-kanji converting process described below.

Although only a digital copier 1 is taken as an example of the information processing apparatus in the following description, the present invention is also applicable to every type of information processing apparatus, such as multi-function peripherals (MFP), facsimile apparatuses, television receivers, and various recorders recording sound or video/sound as long as the apparatus is a network-connectable apparatus (network device), and is also applicable to other PCs (PCs usually not used by a user). With regard to a situation where a user wants to acquire the Japanese-language conversion candidates same as the PC usually used by the user from another PC, for example, such a situation may occur when the user usually working with a fixed-type PC uses a mobile PC or a PC disposed at another location because of a meeting, etc.

Figure 1:
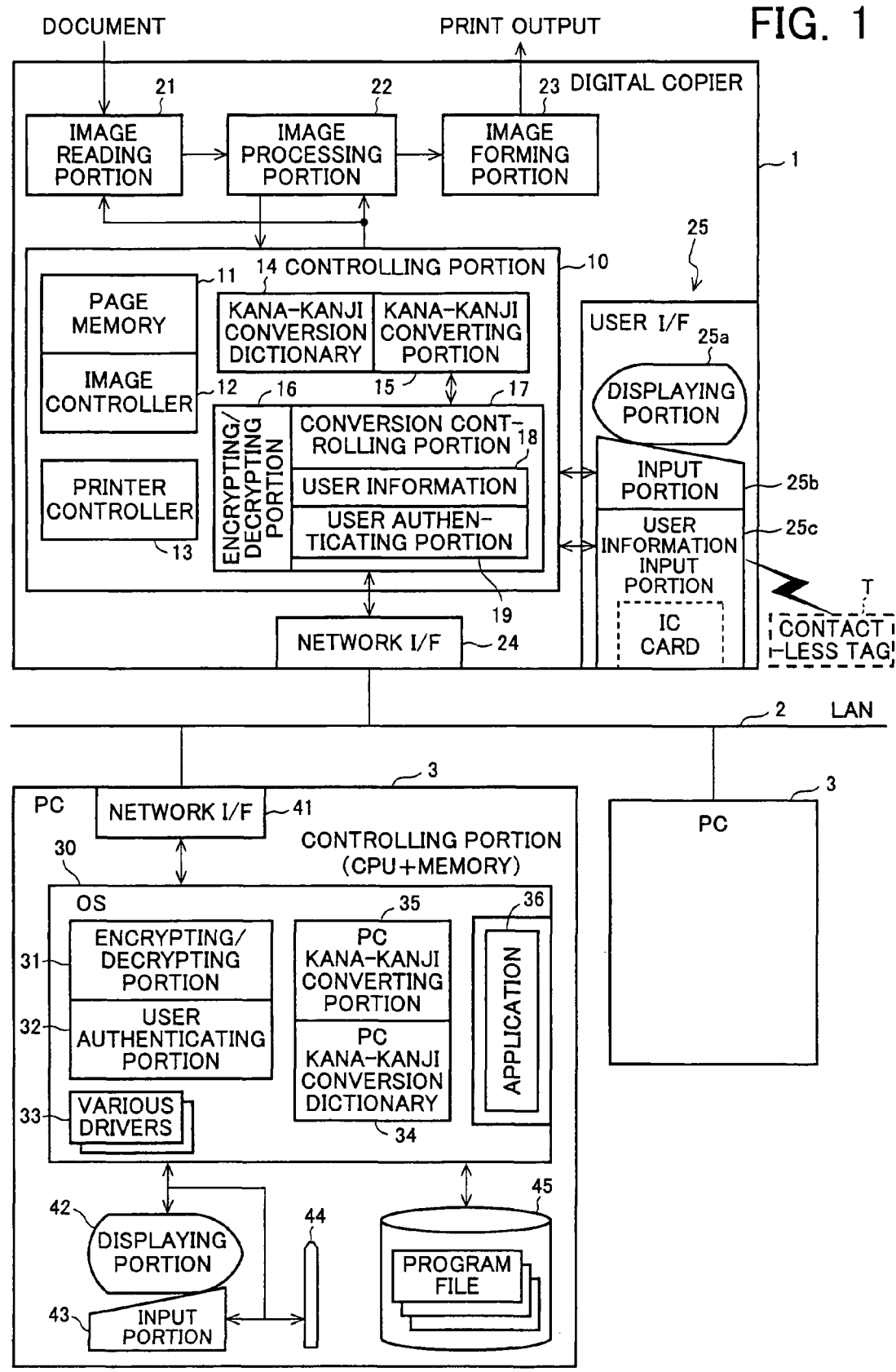
FIG. 1 is a functional block diagram of a configuration example of an information processing system according to an embodiment of the present invention.
Figure 2:
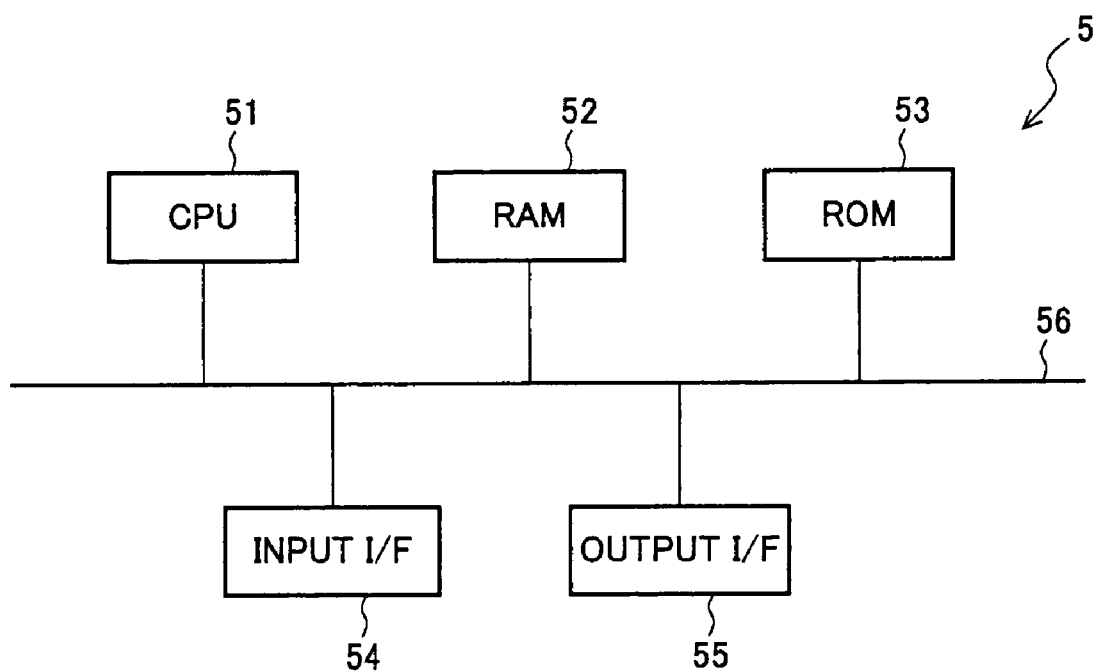
FIG. 2 depicts a configuration example of controlling portions of a digital copier and a PC in the information processing system of FIG. 1.

FIG. 1 is a functional block diagram of a configuration example of an information processing system according to an embodiment of the present invention and FIG. 2 depicts a configuration example of controlling portions of a digital copier and a PC in the information processing system of FIG. 1.

In FIGS. 1 and 2, 1 is a digital copier that is an example of an information processing apparatus; 2 is a LAN (Local Area Network) that is an example of a network; 3 is a PC; 5 is a controlling portion; and T is a contactless tag. The information processing system illustrated in FIG. 1 is constructed by connecting one digital copier 1 to two PCs 3 through the LAN 2.

The PC 3 comprises a network I/F (interface) 41 that communicates with external devices, a displaying portion 42 consisting of a displaying apparatus such as a liquid crystal monitor, an input portion 43 consisting of a keyboard, a mouse, etc., a stylus pen 44 used when a touch panel is employed as an example of the displaying portion 42 and the input portion 43, a hard disk 45 that records various programs and data files, and a controlling portion 30 that controls these portions. Although the network I/F 41 is connected only to the controlling portion 30 in FIG. 1, this is not a limitation.

As shown by a controlling portion 5 of FIG. 2, the controlling portion 30 comprises a CPU (Central Processing Unit) 51, a memory such as a RAM (Random Access Memory) 52, a ROM (Read Only Memory) or rewritable ROM 53 having an OS (Operation System) recorded thereon in a readable manner, an input I/F 54 from the outside of the controlling portion 5, and an output I/F 55 to the outside of the controlling portion 5, and these portions are connected through a bus 56. The information handled within the controlling portion 5 (controlling portion 30 in this case) is temporarily accumulated in the RAM 52 at the time of processing, stored in various ROMs 53 or hard disks, and read by the CPU 51 for modification/writing as needed.

The controlling portion 30 executably incorporates at least a kana-kanji conversion dictionary (referred to as a PC kana-kanji conversion dictionary distinctively from a kana-kanji conversion dictionary 14 described later) 34 and a kana-kanji converting portion (referred to as a PC kana-kanji converting portion distinctively from a kana-kanji converting portion 15 described later) 35 as the OS, more preferably, along with a encrypting/decrypting portion 31, a user authenticating portion 32, and various drivers 33. In other words, the portions 31 to 35 are implemented by recording a PC program (corresponding to the above OS) causing the PC 3 to function as each portion into the ROM 53, etc., and by reading the program therefrom onto the RAM 52 that is an execution area to execute the program with the CPU 51. Additional portions and learned portions of the PC kana-kanji conversion dictionary 34 may separately be stored in the hard disk 45, etc., and may be read as needed. Various applications 36 indicate various programs read from the hard disk 45 to the RAM 52 and being executed by the CPU 51.

The PC kana-kanji converting portion 35 is a PC Japanese-language converting portion that refers to the PC kana-kanji conversion dictionary 34 to return conversion candidates (generally displayed in the order from the highest priority). The PC kana-kanji converting portion 35 and the PC kana-kanji conversion dictionary 34 are executably incorporated in the OS as kana-kanji conversion software, for example, ATOK (registered trademark) and MS-IME (registered trademark). The PC kana-kanji conversion dictionary 34 includes data of a kana-kanji conversion dictionary attached to the kana-kanji conversion software, dictionary data registered by a user, learning data generated by a learning function for preferentially returning frequently used words, etc.

The PC kana-kanji converting portion 35 of the embodiment refers to the PC kana-kanji conversion dictionary 34 to return conversion candidates (such that the candidates can generally be displayed in the order from the highest priority) not only for characters input from the inside of the PC 3 (such as the input portion 43) as above but also for a character string received from the digital copier 1 via the network through the network I/F 41. That is, the PC 3's program executably recorded in the ROM 53, etc., as the PC kana-kanji converting portion 35 is a program that causes the PC 3 (such as the CPU 51) to execute a step of receiving only a character string input by the digital copier 1 from the digital copier 1 via the network and returning conversion candidates to the digital copier 1 after Japanese-language conversion. The present invention can employ a form of PC program incorporated in the PC 3 connected to the digital copier 1 through the network.

Although the kana-kanji conversion software may be installed as a program not included in the OS and may be read as the application 36 at the time of execution, the description of the PC kana-kanji converting portion 35 (and PC kana-kanji conversion dictionary 34) incorporated as the OS can adequately substitute for the description of this case.

On the other hand, the digital copier 1 comprises a general configuration of a digital copier, i.e., an image reading portion 21 that reads an image from a document, an image processing portion 22 that executes an imaging process for the image data, etc., read by the image reading portion 21, an image forming portion 23 that forms an image from the image data processed by the image processing portion 22 on a recording medium such as a sheet, a network I/F 24 that communicates with external devices, a user interface portion (UI portion) 25, and a controlling portion 10 that controls these portions. However, in the digital copier 1 of the embodiment, the control portion 10 (and the UI portion 25) comprises a portion described later according to the present invention, which is not included in the general configuration. Although the network I/F 24 is connected only to a conversion controlling portion 17 in FIG. 1, this is not a limitation.

The UI portion 25 includes a displaying portion 25*a* that displays a screen to be operated, operation results, operation guidance, etc., an input portion 25*b* including operation buttons and an operation area on a touch panel configured as the displaying portion 25*a* to accept user operation, and a user information input portion 25*c* that inputs user information from a receiving portion reading tag data of an IC card or the contactless tag T, the same input portion 25*b*, etc. In the digital copier 1 of the embodiment, the UI portion 25 deals with the character input from a user and the display for a user. In fact, as described later, the UI portion 25 transmits the characters accepted by the input portion 25*b* from a user to the conversion controlling portion 17 and displays the kana-kanji conversion result as a response thereto on the displaying portion 25*a*.

As shown by the controlling portion 5 of FIG. 2, just like the PC controlling portion 30, the controlling portion 10 comprises the CPU 51, the memory such as the RAM 52, the ROM/rewritable ROM 53 having the OS recorded thereon in a readable manner, the input I/F 54, and the output I/F 55, and these portions are connected through the bus 56. The information handled within the controlling portion 5 (controlling portion 10 in this case) is temporarily accumulated in the RAM 52 at the time of processing, stored in various ROMs 53 or hard disks, and read by the CPU 51 for modification/writing as needed.

The controlling portion 10 comprises a page memory 11 that is included as a general constituent element of a digital copier, an image controller 12 that performs control related to images for the image reading portion 21 and the image processing portion 22, and a printer controller 13 that controls the image formation of the image forming portion 23 directly or by controlling the image processing portion 22.

In the digital copier 1 of the embodiment, the controlling portion 10 comprises at least a kana-kanji conversion dictionary (referred to as a main-body kana-kanji conversion dictionary distinctively from the PC kana-kanji conversion dictionary 34) 14 and a kana-kanji converting portion (referred to as a main-body kana-kanji converting portion distinctively from the PC kana-kanji converting portion 35) 15, and a conversion controlling portion 17 in addition to the portions 11 to 13, more preferably, along with an encryption/decryption processing portion (encrypting/decrypting portion) 16. The conversion controlling portion 17 comprises a user authenticating portion 19 and stores user information 18 used for authentication in the user authenticating portion 19.

The potions 14 to 19 are executably incorporated as a main-body Japanese-language converting program into the controlling portion 10. In other words, the potions 14 to 19 are implemented by recording a main-body program causing the controlling portion 10 to function as each portion into the ROM 53, etc., in the controlling portion 10 and by reading and executing the program with the CPU 51 therefrom onto the RAM 52 that is an execution area. Additional portions and learned portions of the main-body kana-kanji conversion dictionary 14 may separately be stored in a recording medium such as a rewritable hard disk, and may be read as needed. The encrypting/decrypting portion 16, etc., may be hardware configuration.

The main-body kana-kanji converting portion 15 of the embodiment is a main-body Japanese-language converting portion that receives a character string input from the UI portion 25 as above and that refers to the main-body kana-kanji conversion dictionary 14 to return conversion candidates (such that the candidates can generally be displayed in the order from the highest priority). The main-body kana-kanji converting portion 15 and the main-body kana-kanji conversion dictionary 14 can be executably incorporated into the controlling portion 10 not only as general-purpose kana-kanji conversion software, for example, ATOK (registered trademark) and MS-IME (registered trademark), but also as other dedicated kana-kanji conversion software. The main-body kana-kanji conversion dictionary 14 includes data of the kana-kanji conversion dictionary attached to the kana-kanji conversion software of the main body, dictionary data registered in the main body by a user, learning data generated by a learning function in the main body for preferentially returning frequently used words, etc., as is the case with PC kana-kanji conversion dictionary 34.

The conversion controlling portion 17 controls the interaction between the UI portion 25 and the PC kana-kanji converting portion 35 as well as the main-body kana-kanji converting portion 15. Although not shown, a PC identifying portion is disposed on the conversion controlling portion 17 and identifies the PC 3 corresponding to the user currently using the digital copier 1. The PC 3 can also be identified by retaining a correlation table for users and PCs as the user information 18 used for user authentication in the user authenticating portion 19 and by referring to the table. The conversion controlling portion 17 supplies the character string input with the UI portion 25 to the PC kana-kanji converting portion 35 of the PC 3 identified by the PC identifying portion or to the PC kana-kanji converting portion 35 and the main-body kana-kanji converting portion 15 for conversion, and sends the conversion results, i.e., conversion candidates to the UI portion 25 for display.

In this way, the main-body Japanese-language conversion program executably recorded in the ROM 53, etc., as the main-body kana-kanji converting portion 15, the conversion controlling portion 17, and the PC identifying portion is a program that causes the controlling portion 10 to execute a PC identifying step of identifying the PC 3 corresponding to the user currently using the digital copier 1; a converting step consisting of a PC kana-kanji converting (Japanese-language converting) step of transmitting the character string input with the UI portion 25 to the identified PC 3 through the network to receive the conversion candidates from the PC3 or consisting of the PC kana-kanji converting step and a main-body kana-kanji converting (Japanese-language converting) step of receiving the character string input with the UI portion 25 to return conversion candidates; and a result displaying step of sending to the UI portion 25 and displaying the conversion candidates that are the conversion result acquired by executing the converting step consisting of the PC kana-kanji converting step or the PC kana-kanji converting step and the main-body kana-kanji converting step for the character string input with the UI portion 25. The present invention can employ a form of main-body Japanese-language converting program to be incorporated in the digital copier 1.

As described above, according to the embodiment, the result of conversion by the PC 3 usually used by a user can be utilized regardless of the kana-kanji conversion software installed in the digital copier 1 even when the software is an exclusively created kana-kanji conversion software, and therefore, the same result as the conversion candidates of the PC 3 can be acquired. Therefore, even in the case of the digital copier 1 different from the PC 3 usually used by the user, the information processing system (Japanese-language input system) of the embodiment can acquire the same kana-kanji conversion candidates as the PC 3 without unifying Japanese-language converting programs and unifying usage environments.

A PC used in the home or a so-called home computer incorporating AV devices may be used as a home server by all the family members and can also employ a form that one PC 3 retains the dictionary additional information of each of a plurality of users to acquire from the digital copier 1 the same result as the conversion result of each user.

In another embodiment of the present invention, after the conversion controlling portion 17 sends the character string input with the UI portion 25 to the main-body kana-kanji converting portion 15 for conversion and sends the conversion results, i.e., conversion candidates to the UI portion 25 for display, the conversion controlling portion 17 may send the character string input with the UI portion 25 to the PC kana-kanji converting portion 35 through the network for conversion in accordance with a user instruction input from the UI portion 25 and may receive through the network and send the conversion results, i.e., conversion candidates to the UI portion 25 for display.

In the process corresponding to the user instruction, when the conversion result of the main-body kana-kanji converting portion 15 is displayed on the UI portion 25, if a user presses down a conversion key or determination key in the UI portion 25, the conversion is determined and the next kana-kanji conversion in the PC 3 is not performed. On the other hand, when the conversion result of the main-body kana-kanji converting portion 15 is displayed on the UI portion 25, if a user presses down a key other than the key for determination in the UI portion 25, the conversion is not determined and the process is shifted to the next kana-kanji conversion in the PC 3. That is, the conversion controlling portion 17 controls the UI portion 25 and the kana-kanji converting portion 15 of the digital copier 1 to send each input to the PC 3, and the PC kana-kanji converting portion 35 returns candidates in accordance with the conversion instruction such that the user can utilize the candidates of the both kana-kanji conversions. Since the conversion result of the main-body side is displayed once in the embodiment, no delay occurs between the conversion instruction and the display of candidates.

In the converting step of the main-body Japanese-language converting program in this embodiment, after executing the main-body kana-kanji converting step to convert the character string input with the UI portion 25 and sending the conversion results, i.e., conversion candidates to the UI portion 25 for display, the PC kana-kanji converting step is executed in accordance with the user instruction input from the UI portion 25 to send through the network and convert the character string input with the UI portion 25 and to receive through the network and send the conversion results, i.e., conversion candidates to the UI portion 25 for display.

In another embodiment of the present invention, the conversion controlling portion 17 may sequentially send the character string input with the UI portion 25 through the network to the PC kana-kanji converting portion 35 of the identified PC 3 for conversion each time one character is input. On the other hand, when receiving an input character from the digital copier 1, if the PC kana-kanji converting portion 35 is in process of converting the character string received before (until the previous time), the converting process is terminated to start the conversion of the character string having added thereto the input character received this time. The conversion controlling portion 17 sequentially receives through the network and sends the conversion results, i.e., conversion candidates to the UI portion 25 for display. As compared to the process of sending the character string to the PC 3 to request the conversion candidates after waiting until the pressing down of the conversion key, the determination key, etc., by a user is accepted in the UI portion 25, a delay of conversion can be prevented in this embodiment since the converting process of the PC kana-kanji converting portion 35 follows the changes in the input character string.

In the converting step of the main-body Japanese-language converting program in this embodiment, the PC kana-kanji converting step is executed to sequentially send through the network and convert the character string input with the UI portion 25 each time one character is input, and the conversion results, i.e., conversion candidates are received through the network and are sent to the UI portion 25 for display. In the PC kana-kanji converting step of the main-body Japanese-language converting program, if the converting process of the previously received character string is executed when receiving an input character from the digital copier 1, the PC 3 is forced to terminate the converting process to start the conversion of the character string having added thereto the input character received this time. The resulting conversion candidates are received from the PC 3.

In the above embodiments, if the PC identifying portion can identify the PC 3, the conversion controlling portion 17 may confirm the operation of the PC kana-kanji converting portion 35 in the PC 3 through the network. If the operation of the PC kana-kanji converting portion 35 cannot be confirmed, the conversion controlling portion 17 may send the character string input with the UI portion 25 only to the main-body kana-kanji converting portion 15 for conversion and may send the conversion results, i.e., conversion candidates to the UI portion 25 for display. In this embodiment, wasteful communication can be avoided.

In the converting step of the main-body Japanese-language converting program in this embodiment, it is confirmed through the network whether the PC 3 identified at the PC 3 identifying step can execute the PC kana-kanji converting step, and if the execution is impossible, only the main-body kana-kanji converting step is executed to send and convert the character string input with the UI portion 25 and the conversion results, i.e., conversion candidates are sent to the UI portion 25 for display.

In the above embodiments, it is preferable that the digital copier 1 and/or the PC 3 comprise the user authenticating portions 19, 32 as shown in FIG. 1. If the user authenticating portion 19 cannot authenticate a user, the conversion controlling portion 17 may send the character string input with the UI portion 25 only to the main-body kana-kanji converting portion 15 for conversion and may send the conversion results, i.e., conversion candidates to the UI portion 25 for display. The user authentication may be executed by the user authenticating portion 32 through the network or may be executed by the both user authenticating portions 19 and 32.

In the user authentication with the main-body user authenticating portion 19, a user holds up the own contactless tag T over the digital copier 1, inserts the own IC card into a slot of the user information input portion 25c, or input the own ID (and password) with the user information input portion 25c to cause the user information to be read, and the authentication succeeds only when the result is compared and matched with the user information 18. The user authentication with the PC user authenticating portion 32 may be performed by reading the user information with the digital copier 1 in the same way and transmitting the result to the PC 3 to check against the user information not shown in the PC 3. Since the input character string is sent only to the main-body kana-kanji converting portion 15 for conversion if one or both authentications are not successful, the information of words used by a user can be prevented from leaking from the PC 3.

In this embodiment, the converting step of the main-body Japanese-language converting program includes a user authenticating step of performing user authentication with the digital copier 1 and/or the PC 3, and if the user cannot be authenticated at the user authenticating step, only the main-body kana-kanji converting step is executed to send and convert the character string input with the UI portion 25, and the conversion results, i.e., conversion candidates are sent to the UI portion 25 for display.

In the above embodiments, it is preferable that the digital copier 1 and the PC 3 comprise the encrypting/decrypting portions 16, 31 as shown in FIG. 1. The encrypting/decrypting portion on the transmission side encrypts the character string and conversion candidates transmitted and received through the network between the digital copier 1 and the PC 3, and the encrypting/decrypting portion on the reception side decrypts the encrypted character string or conversion candidates.

To encrypt and exchange the input character string and conversion candidates through the network, the encrypting/decrypting process must be coordinated between the digital copier 1 and the PC 3 such as by mutually recognizing keys. For example, the PC 3 may hold a secret key and the digital copier 1 may release a corresponding public key, or a common key may be held in the IC card, etc.

The conversion controlling portion 17 performs control such that the character string to be transmitted to the PC 3 is transmitted to the PC 3 after the encrypting process is executed by the main-body encrypting/decrypting portion 16. The controlling portion 30 of the PC 3 performs control to decrypt the transmitted encrypted character string with the PC encrypting/decrypting portion 31, to convert the decrypted character string with the PC kana-kanji converting portion 35, to encrypt the resulting conversion candidates with the PC encrypting/decrypting portion 31, and to transmit the candidates to the digital copier 1 through the network. The conversion controlling portion 17 performs control such that the received encrypted conversion candidates are decrypted by the main-body encrypting/decrypting portion 16 and displayed by the UI portion 25.

This embodiment prevents the information of words used by a user from being leaked by intercepting the network. Such main-body and PC Japanese-language converting programs can also be described and the description of the programs of this embodiment will be omitted.

Flows of processes including the above embodiments appropriately combined will hereinafter be described. First, an initializing process of the digital copier 1 (a process of enabling the Japanese-language conversion with the use of the PC 3) will be described with an example, and an actual Japanese-language converting process will then be described with an example.

Figure 3:
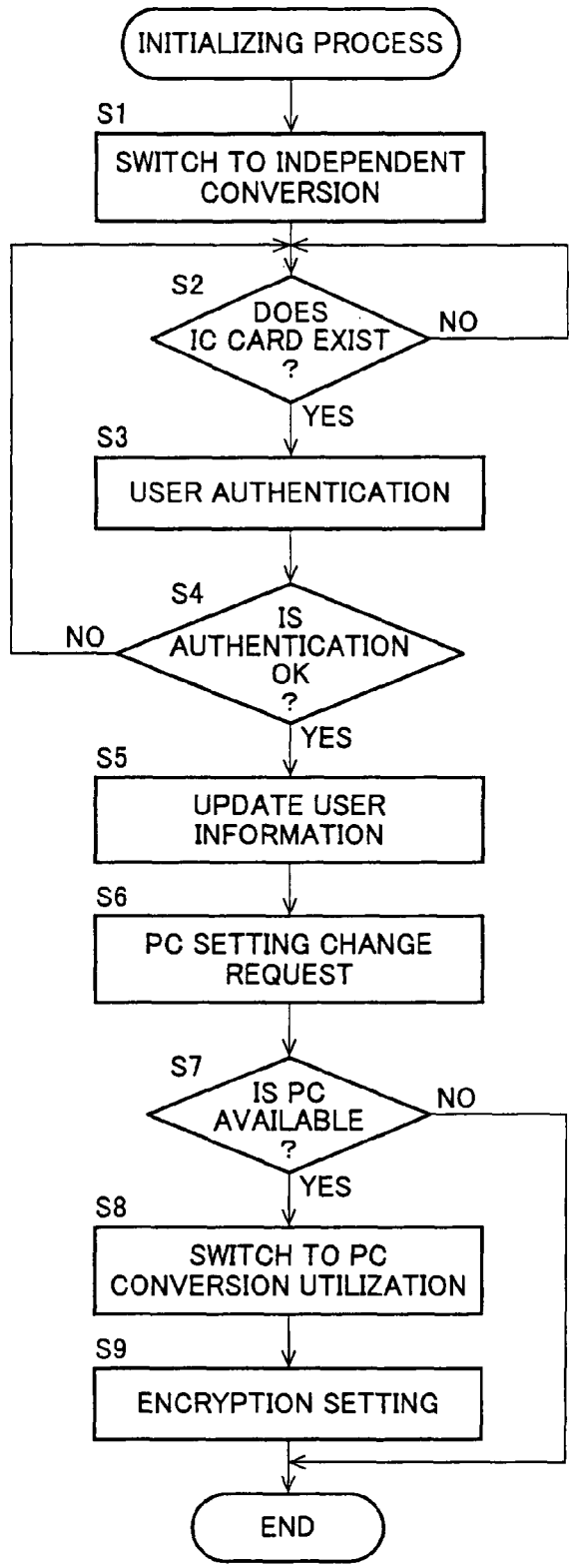
FIG. 3 is an explanatory flow diagram of an example of an initializing process of the digital copier in the information processing system of FIG. 1.
Figure 4:
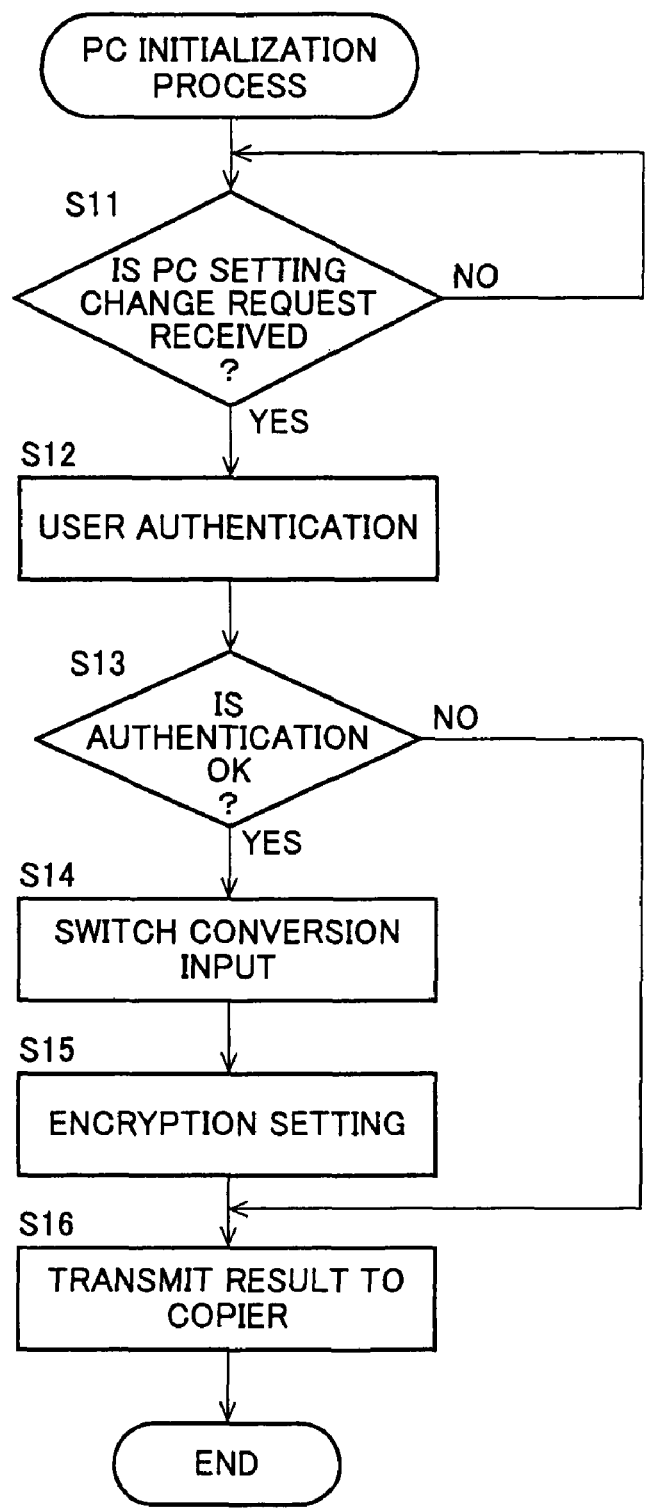
FIG. 4 is an explanatory flow diagram of an example of an initializing process of the PC in the information processing system of FIG. 1.

FIG. 3 is an explanatory flow diagram of an example of the initializing process of the digital copier in the information processing system of FIG. 1, and FIG. 4 is an explanatory flow diagram of an example of the initializing process of the PC in the information processing system of FIG. 1.

First, the digital copier 1 is switched by the conversion controlling portion 17 to the main-body independent conversion at the time of start-up of the main body or start-up of a process requiring the Japanese-language conversion (step S1). The conversion controlling portion 17 determines whether the IC card exists (step S2) and the subsequent process is executed only when the IC card is inserted. The conversion controlling portion 17 instructs the user authenticating portion 19 to perform the user authentication, and the user authenticating portion 19 checks the user information in the inserted IC card against the user information 18 preliminarily stored in the conversion controlling portion 17 (step S3).

The user authenticating portion 19 then determines whether the authentication is successful (step S4), and the conversion controlling portion 17 goes back to step S2 if the authentication is not successful and goes to the next step S5 if the authentication is successful. At step S5, the conversion controlling portion 17 executes a process such as reading onto the memory and making available the information of the authenticated user. This process is an information updating process, such as identifying the corresponding PC 3 with the PC identifying portion to read a network address thereof as the user information, reading the user registration dictionary of the main-body kana-kanji conversion dictionary 14, and reading the user learning data of the main-body kana-kanji converting portion 15. At step S5, if new additional information is added as the user information to the IC card or if changed user information (e.g., information about the PC corresponding to the user) is recorded, the conversion controlling portion 17 may update the internal user information 18 with the information.

The conversion controlling portion 17 then sends a setting change request to the PC 3 corresponding to the user (step S6). In response to step S6, the corresponding PC 3 executes the process of steps S11 to S16 illustrated in FIG. 4.

The controlling portion 30 of the corresponding PC 3 determines whether the network I/F 41 receives the request from the digital copier 1 (step S11) and executes the process of subsequent steps S12 to S16 only when the request is received.

The controlling portion 30 instructs the user authenticating portion 32 to check the user information included in the setting change request against the internal user information preliminarily stored, and the user authenticating portion 32 performs the user authentication (step S12). The user authenticating portion 32 determines whether the authentication is successful (step S13), and if the authentication is not successful, the controlling portion 30 goes to step S16 and transmits the result of unsuccessful authentication to the digital copier 1 (the conversion controlling portion 17).

On the other hand, if the authentication is successful, the controlling portion 30 switches the conversion input from an own process, which returns conversion candidates as a response to the input from the PC 3 itself, to an external request process, which returns conversion candidates as a response to the input transmitted from the digital copier 1 (step S14). The own process and the external request process may concurrently be executed in the PC 3. The controlling portion 30 performs setting of encryption such as setting of the key in the encrypting/decrypting portion 31 (step S15), and transmits the information of the key to the digital copier 1 (conversion controlling portion 17) as a response to the setting change request in accordance with the success of the user authentication and when needed (step S16). Contents of the encryption setting may preliminarily be supplied along with the request at step S6, and the process of step S15 may be executed based on the supplied contents.

If the result of step S16 is received through the network I/F 24, the conversion controlling portion 17 determines whether the result indicates that the corresponding PC 3 is available (step S7), and if the corresponding PC 3 is not available, the process is terminated. On the other hand, if it is determined that the corresponding PC 3 is available, the conversion controlling portion 17 performs the encryption setting based on the encryption setting contents included as needed in the received result or based on the setting contents preliminarily supplied along with the request at step S6 (step S9) and terminates the initializing process. The following kana-kanji converting process can be executed only when a user is authenticated in the above initializing process.

Figure 5:
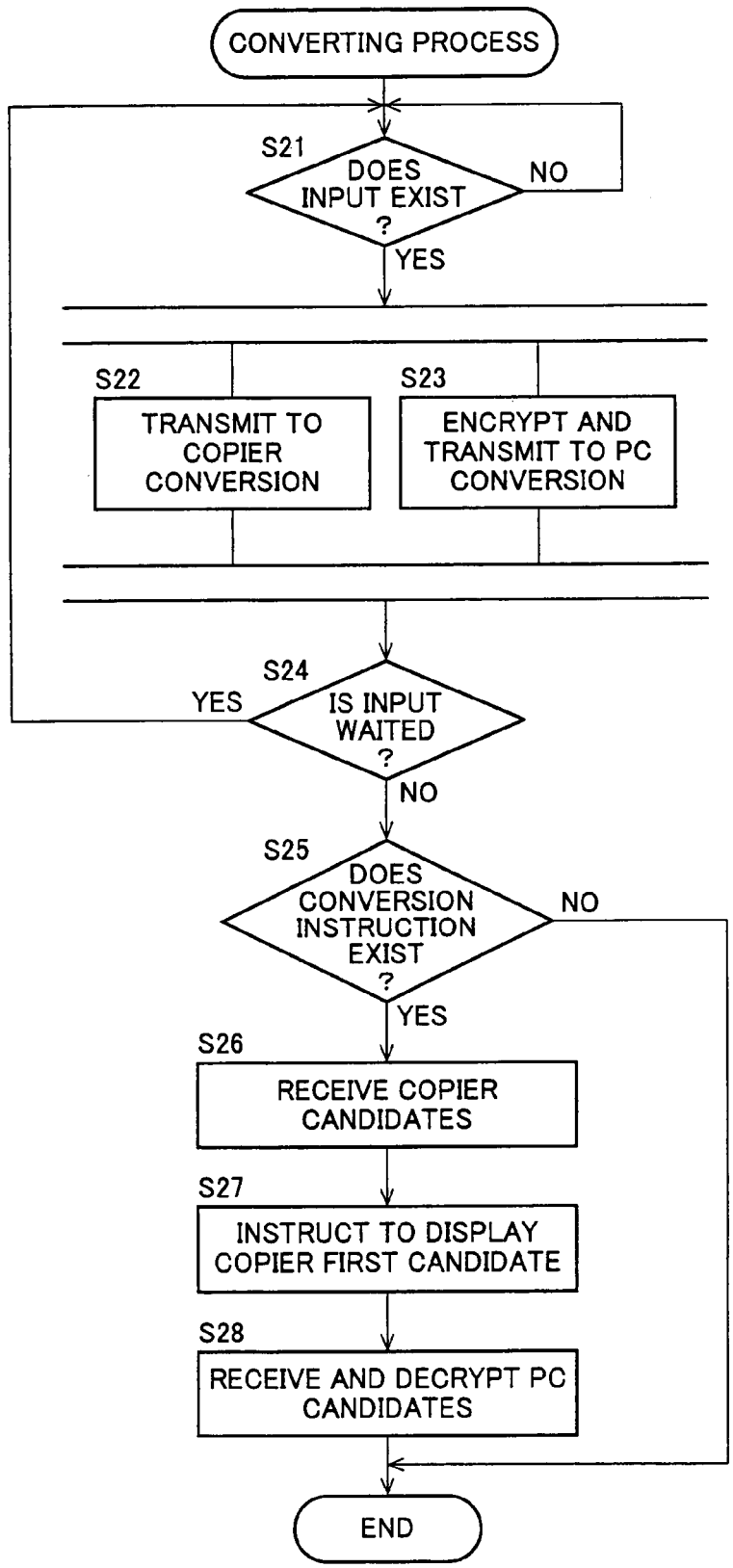
FIG. 5 is an explanatory flow diagram of an example of a kana-kanji converting process of the digital copier in the information processing system of FIG. 1.
Figure 6:
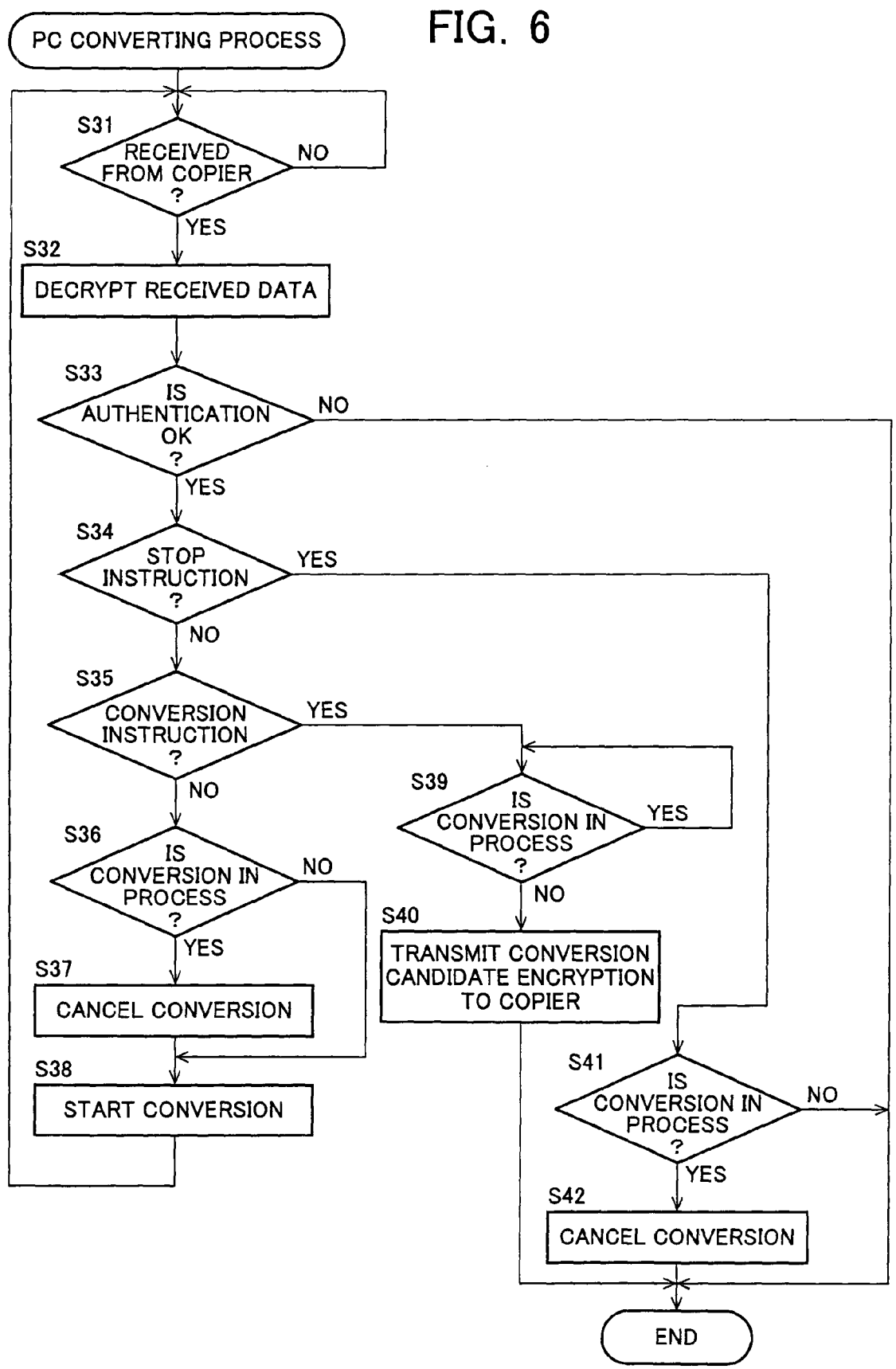
FIG. 6 is an explanatory flow diagram of an example of a kana-kanji converting process of the PC in the information processing system of FIG. 1.

FIG. 5 is an explanatory flow diagram of an example of the kana-kanji converting process of the digital copier in the information processing system of FIG. 1, and FIG. 6 is an explanatory flow diagram of an example of the kana-kanji converting process of the PC in the information processing system of FIG. 1.

The converting process is started when the conversion controlling portion 17 determines whether the UI portion 25 receives the user character input (step S21). If the UI portion 25 receives the user character input, the conversion controlling portion 17 transmits the character to the main-body kana-kanji converting portion 15 (step S22) and also transmits through the network I/F 24 to the PC kana-kanji converting portion 35 of the corresponding PC 3 after the encryption by the encrypting/decrypting portion 16 (step S23). As a result of the step S22, the main-body kana-kanji converting portion 15 converts the character. As a result of the step S23, as described later at steps S31 to S42, the PC kana-kanji converting portion 35 converts the character and the result is returned through the network to the conversion controlling portion 17.

The conversion controlling portion 17 determines whether the next character input is waited (step S24); if the input is waited, the process goes back to step S21; and if the input is not waited, it is determined whether the conversion instruction exists (step S25). At step S24, if the determination key, the conversion key, and other processing keys are not pressed down, it is determined that the input is waited. At step S25, if the determination key, the conversion key, etc., are pressed down, it is determined that the conversion instruction exists.

If the conversion instruction exists, the conversion controlling portion 17 receives the conversion candidates acquired as the conversion results of the main-body kana-kanji converting portion 15 (step S26) and instructs the UI portion 25 to display a first candidate thereof (step S27), and the UI portion 25 performs the display as instructed. Regardless of whether the display at step S27 has been performed, the conversion candidates acquired as the conversion results of the PC kana-kanji converting portion 35 are received and decrypted continuously or based on the user instruction after step S27 by the encrypting/decrypting portion 16 (step S28); the UI portion 25 is instructed to display a first candidate thereof; and the UI portion 25 performs the display as instructed.

The converting process of the PC will be described. The controlling portion 30 determines whether data are received from the digital copier 1 (step S31), the following process will be executed only when the data are received. The controlling portion 30 decrypts the received data with the encrypting/decrypting portion 31 (step S32), determines whether the authentication has been successful in the above PC initializing process (step S33), and terminates the process if the authentication has failed. Not only in the case of this termination, but also in the case described that the process is terminated without returning any result, an error may be returned to the digital copier 1 to indicate inaccessibility, etc.

If the authentication has been successful at the step S33, the controlling portion 30 determines whether the decrypted data are a cancel instruction (step S34); if the data are the cancel instruction, it is determined whether the conversion of previous data is currently in process in the PC kana-kanji converting portion 35 (step S41); if the conversion is in process, the conversion is canceled (step S42) to terminate the process; and if the conversion is not in process, the process is directly terminated.

If it is determined that the data are not the cancel instruction at step S34, the controlling portion 30 determines whether the decrypted data are a conversion instruction (step S35); if the data are the conversion instruction, the controlling portion 30 waits for the completion of the conversion (step S39); the conversion candidates are encrypted with the encrypting/decrypting portion 31 and transmitted to the digital copier 1 (step S40); and the process is terminated. On the other hand, if it is determined that the data are not the conversion instruction, the controlling portion 30 determines whether the conversion is currently in process (step S36), executes the process of canceling the conversion of the previous data (step S37) if the conversion is in process in the PC kana-kanji converting portion 35, and then gives a conversion start instruction to the PC kana-kanji converting portion 35 to start the conversion (step S38), and the process goes back to step S31.

Figure 7:
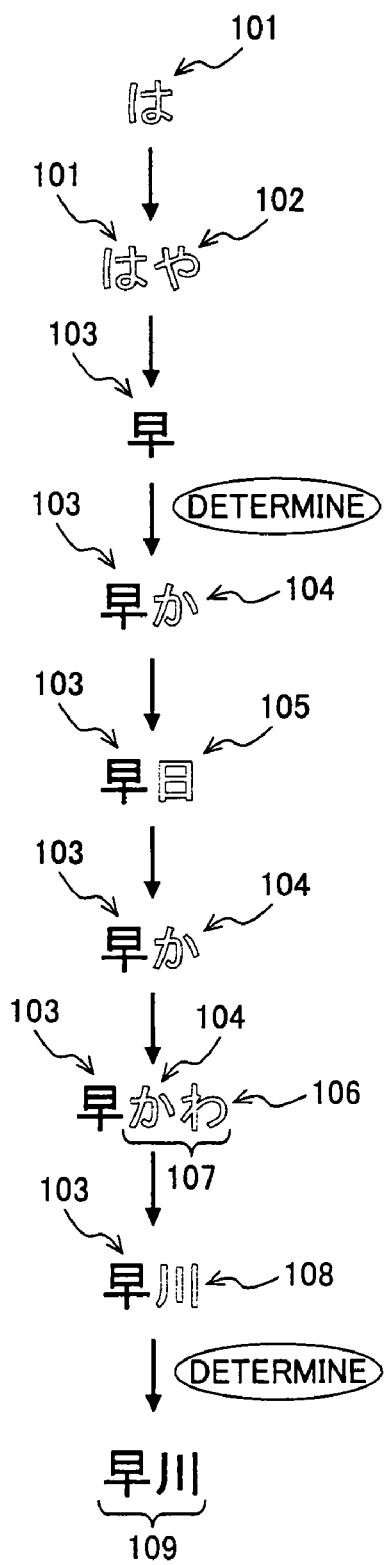
FIG. 7 is an explanatory diagram of a course of a kana-kanji converting process in the information processing system of FIG. 1 with specific character strings.

FIG. 7 is an explanatory diagram of a course of the kana-kanji converting process in the information processing system of FIG. 1 with specific character strings. Description will be made of the user operation and the processes in the main body/PC when it is desirable to acquire kanji characters "Hayakawa" 109 as a conversion result if hiragana characters "Ha" 101, "Ya" 102, "Ka" 104, and "Wa" 106 are sequentially input from the UI portion 25.

After a hiragana character "Ha" 101 is input, when a hiragana character "Ya" 102 is input, if a conversion result of the main-body kana-kanji converting portion 15 is, for example, a kanji character "Haya" 103, a user uses the determination key, etc., to directly determine the kanji character "Haya" 103 and switches the reversed character to the normal display. When a hiragana character "Ka" 104 is then input and a conversion result of the main-body kana-kanji converting portion 15 is a kanji character "Hi" 105, although this character is displayed, the user waits for a conversion result of the PC kana-kanji converting portion 35 since this character cannot be employed. The user continuously inputs a hiragana character "Wa" 106. Even if the conversion for the hiragana character "Ka" 104 is in process in the PC kana-kanji converting portion 35 when the hiragana character "Wa" 106 is input, the conversion is canceled and the kana-kanji conversion is executed for hiragana characters "Ka-Wa" 107. As a result of the input of the hiragana character "Wa" 106, if the conversion result of the main-body kana-kanji converting portion 15 is hiragana characters "Ka-Wa" 107, the result from the PC is waited. The conversion in the PC kana-kanji converting portion 35 is performed for the hiragana characters "Ka-Wa" 107, and the result is a kanji character "Kawa" 108. Although the result stays reversely displayed, if the determination key is pressed down, the kanji character "Kawa" 108 is determined and the reversed characters are changed to normal characters to display the kanji characters "Hayakawa" 109 as the final result.

Although the present invention has been described as above, distribution of programs will complementarily be described. The digital copier Japanese-language converting program and/or the PC Japanese-language converting program (particularly, the program of a portion returning conversion candidates for received characters) according to the present invention described in FIGS. 1 and 2 may be stored into and distributed through a computer readable recording medium along with data such as dictionaries as needed or may be distributed through the network. Specifically, it can be assumed that such a recording medium can be CD-ROM, magnetic optical disk, DVD-ROM, FD, flash memory, and other various ROM and RAM. The above programs are recorded into and distributed through the recording medium to facilitate implementation of the functions according to the present invention.

For example, the digital copier program can executably be stored in the digital copier by mounting the above recording medium on the PC, etc., to read and transfer the digital copier program to the controlling portion of the digital copier, or by mounting the above recording medium on the digital copier to read and transfer the digital copier program to the internal controlling portion. The PC program can executably be stored in the PC by mounting the above recording medium on the PC to read and transfer the PC program with the PC to the controlling portion of the PC. The functions according to the present invention can be executed by reading the programs when needed as described above with reference to FIGS. 1 and 2.

As described with reference to FIGS. 1 to 7, according to the present invention, even in the case of an information processing apparatus different from a computer usually used by a user, the same kana-kanji conversion candidates as the computer can be acquired without unifying Japanese-language converting programs and unifying usage environments.

With reference to FIGS. 2, 8 to 12, description will be made of a process of creating the dictionary additional information of the kana-kanji conversion of the present invention, which is applicable to the above information processing system.

In an information processing system according to the present invention, while an information processing apparatus is connected through a network to a computer (not limited to the fixed/portable type) such as PC or workstation usually used by a user, dictionary additional information for an information processing apparatus is created with the computer such that the same Japanese-language conversion candidates as the computer can be acquired. The computer or information processing apparatus according to the present invention is disposed on the following information processing system, and individual description thereof will basically be omitted. Although a PC is shown as an example of the computer, the present invention is also applicable to other computers such as a workstation or home computer integrated with a set-top box or TV. This information processing system is a Japanese-language input system that can acquire candidates corresponding to a user using the system even in an environment with a plurality of PCs connected to one information processing apparatus. Of course, in a system configuration, one information processing apparatus may be connected to only one PC or a plurality of PCs where the dictionary additional information is created, or a plurality of such information processing apparatuses may be connected (in this case, of course, the information processing apparatuses are permitted to overlap to create the dictionary additional information in a PC). The information processing apparatus must be network-connectable and generally uses a plurality of PCs (PCs usually used by users) as host apparatuses to perform a process of acquiring dictionary additional information and a kana-kanji converting process using the dictionary additional information described below.

Although only a digital copier 1 is taken as an example of the information processing apparatus in the following description, the present invention is also applicable to every type of information processing apparatus, such as multi-function peripherals (MFP), facsimile apparatuses, television receivers, and various recorders recording sound or video/sound as long as the apparatus is a network-connectable apparatus (network device), and is also applicable to other PCs (PCs usually not used by users). With regard to a situation where a user wants to acquire the Japanese-language conversion candidates same as the PC usually used by the user from another PC (a situation where a user wants to acquire the dictionary additional information), for example, such a situation may occur when the user usually working with a fixed-type PC uses a mobile PC or a PC disposed at another location because of a meeting, etc.

Figure 8:
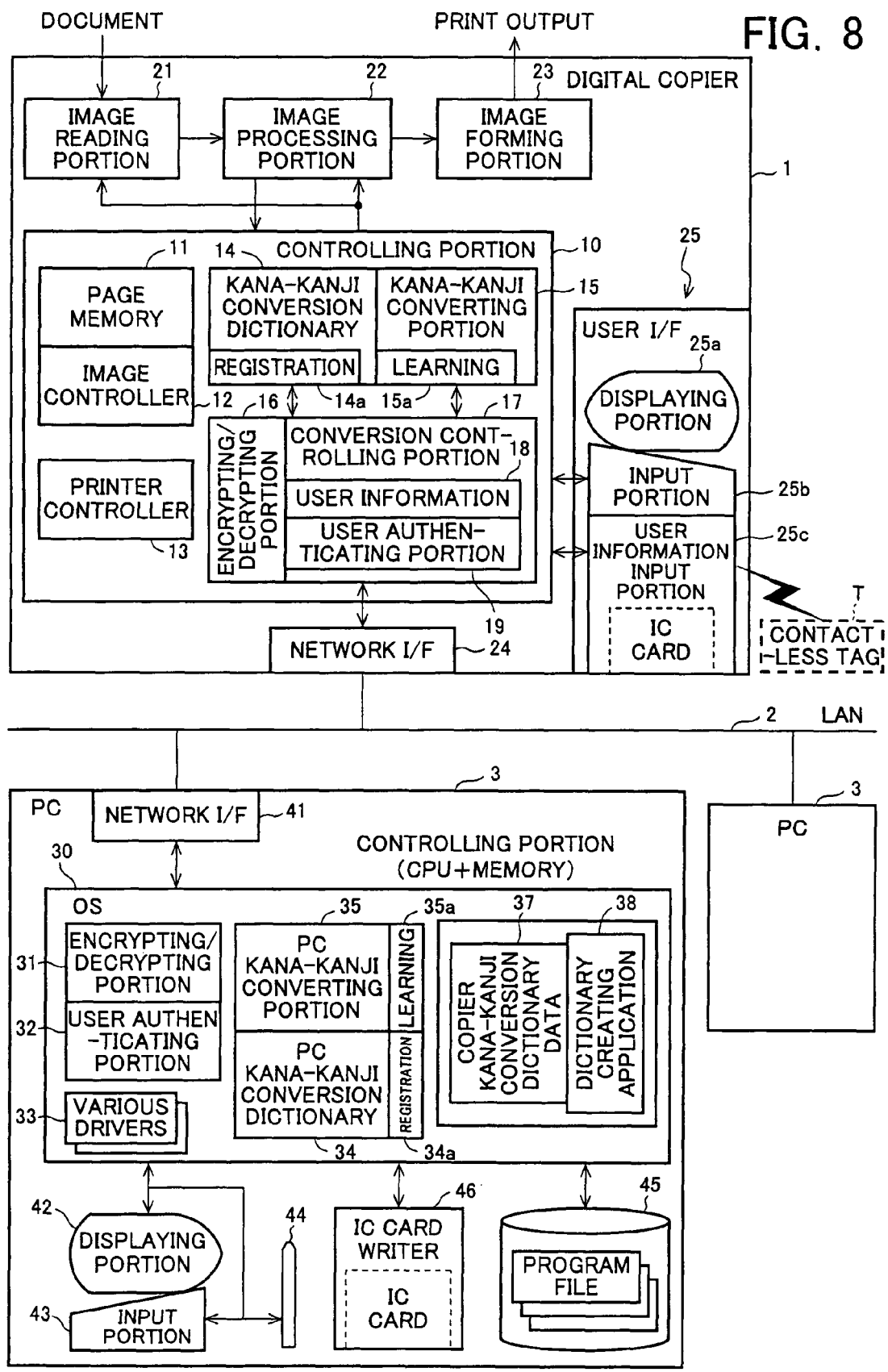
FIG. 8 is a functional block diagram of a configuration example of an information processing system according to an embodiment of the present invention.

FIG. 8 is a functional block diagram of a configuration example of an information processing system according to an embodiment of the present invention and FIG. 2 also depicts a configuration example of controlling portions of the digital copier and the PC in the information processing system of FIG. 8.

In FIGS. 8 and 2, 1 is the digital copier that is an example of the information processing apparatus; 2 is the LAN (Local Area Network) that is an example of the network; 3 is the PC; 5 is the controlling portion; and T is the contactless tag. The information processing system illustrated in FIG. 8 is constructed by connecting one digital copier 1 to two PCs 3 through the LAN 2.

The PC 3 comprises the network I/F (interface) 41 that communicates with external devices, the displaying portion 42 consisting of a displaying apparatus such as a liquid crystal monitor, the input portion 43 consisting of a keyboard, a mouse, etc., the stylus pen 44 used when a touch panel is employed as an example of the displaying portion 42 and the input portion 43, the hard disk 45 that records various programs and data files, and the controlling portion 30 that controls these portions. Although the network I/F 41 is connected only to the controlling portion 30 in FIG. 8, this is not a limitation.

As shown by the controlling portion 5 of FIG. 2, the controlling portion 30 comprises the CPU (Central Processing Unit) 51, a memory such as the RAM (Random Access Memory) 52, the ROM (Read Only Memory) or rewritable ROM 53 having the OS (Operation System) recorded thereon in a readable manner, the input I/F 54 from the outside of the controlling portion 5, and the output I/F 55 to the outside of the controlling portion 5, and these portions are connected through the bus 56. The information handled within the controlling portion 5 (controlling portion 30 in this case) is temporarily accumulated in the RAM 52 at the time of processing, stored in various ROMs 53 or hard disks, and read by the CPU 51 for modification/writing as needed.

The controlling portion 30 executably incorporates at least the kana-kanji conversion dictionary (referred to as the PC kana-kanji conversion dictionary distinctively from the kana-kanji conversion dictionary 14 described later) 34 and the kana-kanji converting portion (referred to as the PC kana-kanji converting portion distinctively from the kana-kanji converting portion 15 described later) 35 as the OS, more preferably, along with the encrypting/decrypting portion 31, the user authenticating portion 32, and various drivers 33. In other words, the portions 31 to 35 are implemented by recording a PC program (corresponding to the above OS) causing the PC 3 to function as each portion into the ROM 53, etc., and by reading the program with the CPU 51 therefrom onto the RAM 52 that is an execution area to execute the program with the CPU 51.

The PC kana-kanji converting portion 35 is a PC Japanese-language converting portion that refers to the PC kana-kanji conversion dictionary 34, registration data 34a, and learning data 35a for characters input through user operation to return conversion candidates (generally displayed in the order from the highest priority). The PC kana-kanji converting portion 35 and the PC kana-kanji conversion dictionary 34 are executably incorporated in the OS as kana-kanji conversion software, for example, ATOK (registered trademark) and MS-IME (registered trademark).

The PC kana-kanji conversion dictionary 34 indicates data of a kana-kanji conversion dictionary attached to the kana-kanji conversion software; the registration data 34a indicate dictionary additional data registered by a user; and the learning data 35a indicate additional data generated by a learning function for preferentially returning frequently used words. The registration data 34a, the learning data 35a, etc., may separately be stored in the hard disk 45, etc., and may be read as needed. A dictionary creating application 38 is a main feature of the present invention described later, stored in the hard disk 45 along with various applications, read from the hard disk 45 onto the RAM 52, and executed by the CPU 51. In the state shown in FIG. 8, the dictionary creating application 38 and kana-kanji conversion dictionary data 37 created therefrom on the digital copier 1 (main body) side are read onto the RAM 52.

Although the kana-kanji conversion software may be installed as a program not included in the OS and may be read as the application at the time of execution, the description of the PC kana-kanji converting portion 35 (and PC kana-kanji conversion dictionary 34) incorporated as the OS can adequately substitute for the description of this case.

The PC 3 of the present embodiment comprises a dictionary additional information generating portion and a dictionary additional information output portion as the dictionary creating application 38. For the normal dictionary (kana-kanji conversion dictionary) 14 received from the digital copier 1 via the network I/F 41 through the network such as the LAN 2, the dictionary additional information generating portion uses the kana-kanji conversion dictionary 14 as well as the registration data 34a and the learning data 35a for the PC to generate the copier kana-kanji conversion dictionary data 37 (registration data 14a and learning data 15a for the digital copier 1). The dictionary additional information output portion outputs the dictionary data 37 generated by the dictionary additional information generating portion to the outside. A portion of the generating process of the dictionary additional information generating portion may be requested to the digital copier 1 that is a transmission source. In this case, data generated as a response to the request may be received from the digital copier 1, or only that portion may be registered by the digital copier 1 itself without receiving the data.

For example, the dictionary creating application 38 acquires and compares the kana-kanji conversion dictionary 14 of the digital copier 1 with the words learned by or registered into the PC kana-kanji converting portion 35 to create and output the dictionary additional information for the digital copier 1 to the outside such that a user can use the dictionary additional information in the digital copier 1. The above dictionary creating application 38 may include an application that creates the registration data 34a and the learning data 35a for the PC 3.

The PC 3's program (dictionary creating application 38) executably recorded in the ROM 53, etc., as the dictionary additional information generating portion and the dictionary additional information output portion is a program that causes the PC 3 (such as the CPU 51) to execute a step of receiving the kana-kanji conversion dictionary 14 from the digital copier 1 via the network I/F 41 through the network such as the LAN 2, step of using the kana-kanji conversion dictionary 14 as well as the registration data 34a and the learning data 35a for the PC to generate the copier kana-kanji conversion dictionary data 37 (the registration data 14a and the learning data 15a for the digital copier 1), and outputting the generated dictionary data 37 to the outside. In this way, the present invention can employ a form of PC program incorporated in the PC 3 connected to the digital copier 1 through the network.

On the other hand, the digital copier 1 comprises a general configuration of a digital copier, i.e., the image reading portion 21 that reads an image from a document, the image processing portion 22 that executes an image processing for the image data, etc., read by the image reading portion 21, the image forming portion 23 that forms an image from the image data processed by the image processing portion 22 on a recording medium such as a sheet, the network I/F 24 that communicates with external devices, the user interface portion (UI portion) 25, and the controlling portion 10 that controls these portions. However, in the digital copier 1 of the present embodiment, the control portion 10 comprises a portion described later according to the present invention, which is not included in the general configuration. Although the network I/F 24 is connected only to the conversion controlling portion 17 in FIG. 8, this is not a limitation.

The UI portion 25 comprises the displaying portion 25a that displays a screen to be operated, operation results, operation guidance, etc., the input portion 25b including operation buttons and an operation area on a touch panel configured as the displaying portion 25a to accept user operation, and a user information input portion 25c that inputs user information from a receiving portion reading tag data of the IC card or the contactless tag T, the same input portion 25b, etc. The UI portion 25 deals with the character input from a user and the display for a user. In fact, the UI portion 25 transmits the characters accepted by the input portion 25b from a user to the conversion controlling portion 17 and displays the kana-kanji conversion result as a response thereto on the displaying portion 25a.

As shown by the controlling portion 5 of FIG. 2, just like the PC controlling portion 30, the controlling portion 10 comprises the CPU 51, the memory such as the RAM 52, the ROM/rewritable ROM 53 having the OS recorded thereon in a readable manner, the input I/F 54, and the output I/F 55, and these portions are connected through the bus 56. The information handled within the controlling portion 5 (controlling portion 10 in this case) is temporarily accumulated in the RAM 52 at the time of processing, stored in various ROMs 53 or hard disks, and read by the CPU 51 for modification/writing as needed.

The controlling portion 10 comprises the page memory 11 that is included as a general constituent element of a digital copier, the image controller 12 that performs control related to images for the image reading portion 21 and the image processing portion 22, and a printer controller 13 that controls the image formation of the image forming portion 23 directly or by controlling the image processing portion 22.

In the digital copier 1 of the present embodiment, the controlling portion 10 comprises at least the kana-kanji conversion dictionary (referred to as the main-body kana-kanji conversion dictionary distinctively from the PC kana-kanji conversion dictionary 34) 14, the kana-kanji converting portion (referred to as the main-body kana-kanji converting portion distinctively from the PC kana-kanji converting portion 35) 15, and a conversion controlling portion 17 in addition to the portions 11 to 13, more preferably, along with the encrypting/decrypting portion 16. The conversion controlling portion 17 comprises a user authenticating portion 19 and stores user information 18 used for authentication in the user authenticating portion 19.

The portions 14 to 19 are executably incorporated as a main-body program into the controlling portion 10. In other words, the portions 14 to 19 are implemented by recording a main-body program causing the controlling portion 10 to function as each portion into the ROM 53, etc., in the controlling portion 10 and by reading and executing the program with the CPU 51 therefrom onto the RAM 52 that is an execution area.

The main-body kana-kanji converting portion 15 of the present embodiment is a main-body Japanese-language converting portion that receives a character string input from the UI portion 25 as above and that refers to the main-body kana-kanji conversion dictionary 14, the registration data 14a, and the learning data 15a to return conversion candidates (such that the candidates can generally be displayed in the order from the highest priority). The main-body kana-kanji converting portion 15 and the main-body kana-kanji conversion dictionary 14 can be executably incorporated into the controlling portion 10 not only as general-purpose kana-kanji conversion software, for example, ATOK(registered trademark) and MS-IME (registered trademark), but also as other dedicated kana-kanji conversion software.

The main-body kana-kanji conversion dictionary 14 indicates data of a kana-kanji conversion dictionary attached to the kana-kanji conversion software; the registration data 14a indicate dictionary additional data registered by a user; and the learning data 15a indicate additional data generated by a learning function for preferentially returning frequently used words. The registration data 14a, the learning data 15a, etc., may separately be stored in the hard disk, etc., and may be read as needed.

The conversion controlling portion 17 acts as a characteristic portion of the present invention to perform control of transmitting the kana-kanji conversion dictionary 14 to the PC 3 through the network such as the LAN 2 in accordance with user operation or a request from the PC3 and control of externally receiving (receiving and updating) the copier kana-kanji conversion dictionary data 37 (the registration data 14a and the learning data 15a for the digital copier 1) as the response thereto. Although the externally receiving method will be described below with an example, the registration data 14a and the learning data 15a generated as the response are generated by the above PC 3.

In this way, the main-body program executably recorded in the ROM 53, etc., as the conversion controlling portion 17 is a program that causes the controlling portion 10 to execute a step of performing control of transmitting the kana-kanji conversion dictionary 14 to the PC 3 through the network such as the LAN 2 in accordance with user operation or a request from the PC3, a step of performing control of receiving (receiving and updating) the copier kana-kanji conversion dictionary data 37 as the response thereto from the outside, and a step of performing control of causing the kana-kanji converting unit 15 to use the kana-kanji conversion dictionary 14 and externally receiving copier kana-kanji conversion dictionary data 37 (the registration data 14a and the learning data 15a) for performing conversion. In this way, the present invention can employ a form of main-body program to be incorporated in the digital copier 1. A program for causing the controlling portion 10 to function as the main-body kana-kanji converting portion 15 may also be incorporated as the main-body program.

To provide the access right to control which PC 3 receives a response to a request, the conversion controlling portion 17 may identify the PC 3 corresponding to the user currently using the digital copier 1. The PC 3 can also be identified by retaining a correlation table for users and PCs as the user information 18 used for user authentication in the user authenticating portion 19 and by referring to the table. The conversion controlling portion 17 controls the interaction between the UI portion 25 and the PC kana-kanji converting portion 35 as well as the main-body kana-kanji converting portion 15.

As described above, according to the present embodiment, the dictionary additional information of kana-kanji conversion for the main body can be generated based on the main-body dictionary and the PC dictionary additional information (learning and registration words). Therefore, in the information processing system (Japanese-language input system) of the present embodiment, regardless of the kana-kanji conversion software installed in the digital copier 1 that is different from the PC 3 usually used by the user, even when the software is an exclusively created kana-kanji conversion software, the registration words and learning contents of the PC 3 usually used by the user can be reflected in the digital copier 1, and the same Japanese-language conversion results as the PC 3 can be acquired in the digital copier 1.

A PC used in the home or a so-called home computer incorporating AV devices may be used as a home server by all the family members and can also employ a form that one PC 3 generates the dictionary additional information of each of a plurality of users and that the digital copier 1 uses the dictionary additional information of each user to generate each piece of the dictionary additional information for the conversion to acquire from the digital copier 1 the same result as the result of the conversion usually performed by each user with the PC 3.

The dictionary additional information of the digital copier 1 and the dictionary additional information of the PC 3 are not limited to the information of the additional registration word (the registration data) and the information of the learning contents (the learning data) and may be either the information of the additional registration word or the information of the learning contents. For example, appropriate dictionary additional information can be selected depending on whether the dictionary of the digital copier 1 includes the registration word. The dictionary additional information generated by the dictionary additional information generating portion of the PC 3 may all be generated as the registration data 14a even in the case of data corresponding to the learning data 15a.

Although the kana-kanji conversion dictionary 14 is transmitted from the digital copier 1 to the PC 3 in the above description, the registration data 14*a* and the learning data 15*a* existing in the digital copier 1 at the time of transmission may also be transmitted, and the PC 3 may generate/output the copier kana-kanji conversion dictionary data 37 (new registration data 14*a* and learning data 15*a* for the digital copier 1) based on the transmitted data with the dictionary creating application 38.

In this case, the conversion controlling portion 17 writes or adds the output copier kana-kanji conversion dictionary data 37 over or to the existing registration data 14*a* and learning data 15*a* to update the registration data 14*a* and learning data 15*a*. In the case of overwriting, the dictionary creating application 38 may create only for the kana-kanji conversion dictionary 14 a portion of the copier kana-kanji conversion dictionary data 37 from a difference between the registration data 34*a* and the learning data 35*a* of the PC 3, and the remaining portion of the copier kana-kanji conversion dictionary data 37 may be created by adding a difference between the registration data 34*a* and the learning data 35*a* of the PC 3 to the existing registration data 14*a* and learning data 15*a* transmitted from the digital copier 1.

The copier kana-kanji conversion dictionary data 37 may be output to the outside and loaded into the digital copier 1 through the network such as the LAN 2. In this case, the dictionary additional information output portion includes a transmitting portion that transmits the registration data 14*a* and the learning data 15*a* through the network to the digital copier 1 that receives the kana-kanji conversion dictionary 14. The transmitting portion performs the transmission through the LAN 2 via the network I/F 41. The conversion controlling portion 17 performs control of driving the main-body kana-kanji converting portion 15 to perform the conversion with the use of the kana-kanji conversion dictionary 14 and the received copier kana-kanji conversion dictionary data 37 transmitted by the transmitting portion.

In another method, the copier kana-kanji conversion dictionary data 37 may be output to the outside and loaded into the digital copier 1 through a portable storage medium such as an IC card (in the following description, an IC card). In this case, the digital copier 1 must comprise a storage medium reading portion that reads data from the IC card, and in the example shown in FIG. 8, the storage medium reading portion is included as a portion of the user information input portion. The dictionary additional information output portion of PC 3 includes a storage medium writing portion that writes the copier kana-kanji conversion dictionary data 37 into the IC card, and in FIG. 8, the storage medium writing portion is illustrated as an IC card writer 46. The conversion controlling portion 17 performs control of driving the main-body kana-kanji converting portion 15 to perform the conversion with the use of the kana-kanji conversion dictionary 14 and the copier kana-kanji conversion dictionary data 37 read from the IC card. Both functions of the above methods through the network and the IC card may be included such that a user can select and employ either method.

In another embodiment of the present invention, the conversion controlling portion 17 comprises a PC checking portion that checks whether the dictionary additional information generating portion exists in the PC 3 and performs the control of transmitting the kana-kanji conversion dictionary 14 (and the existing registration data 14*a* and learning data 15*a*) to the PC 3 through the network only when the dictionary additional information generating portion exists.

The PC checking portion is not necessary when the kana-kanji conversion dictionary data 37 for the digital copier 1 is created by taking action from the PC 3. For example, with regard to the PC 3 identified by a user, the operation of the PC 3 may be monitored only when taking action from the digital copier 1 (or may constantly be monitored) through the network, and if the operation is confirmed, it is checked through the network whether the internal dictionary creating application 38 exists. In yet another method, the PC checking portion may use the dictionary data acquiring request received from the PC 3 to confirm that the application used for creating the request is the dictionary creating application 38.

In the confirmation of presence of the dictionary creating application 38, of course, even if a dictionary application exists, it is recognized that the dictionary creating application 38 exists only when the target kana-kanji conversion dictionary data 37 for the digital copier 1 can be created. That is, from the viewpoint of the kana-kanji converting portion 15 incorporated into the digital copier 1, only when the appropriate kana-kanji conversion dictionary data 37 can be created, the recognition result indicating the presence is output. As a result, the data related to the dictionary (vocabulary) are prevented from being leaked through the network, and wasteful communication can be avoided.

In the above embodiments, it is preferable that the digital copier 1 and/or the PC 3 include the user authenticating portions 19, 32 as shown in FIG. 8. If the user authenticating portion 19 cannot authenticate a user, the conversion controlling portion 17 may not send to the PC 3 the kana-kanji conversion dictionary 14 as well as the registration data 14*a* and the learning data 15*a* currently used by the user. The user authentication may be executed by the user authenticating portion 32 through the network or may be executed by the both user authenticating portions 19 and 32.

In the user authentication with the user authenticating portion 19, a user holds up the own contactless tag T over the digital copier 1, inserts the own IC card into a slot of the user information input portion 25*c*, or input the own ID (and password) with the user information input portion 25*c* to cause the user information to be read, and the authentication succeeds only when the result is compared and matched with the user information 18. The user authentication with the PC user authenticating portion 32 may be performed by reading the user information with the digital copier 1 in the same way and transmitting the result to the PC 3 to check against the user information not shown in the PC 3.

Particularly, with regard to the user authentication, the dictionary additional information output portion of the PC 3 preferably outputs the generated copier kana-kanji conversion dictionary data 37 to the outside along with the user information relating to the user permitted to use the data 37. This user information can be acquired when a user inputs the ID and password or by reading the IC card inserted into the PC 3, or the PC 3 can also acquire the user information when transmitting to the PC 3 the user information 18 preliminarily stored in the digital copier 1 or the ID and password read from the IC card, the contactless tag T, etc., directly input to the user information input portion 25*c*.

The user authenticating portion 19 reads from the IC card or the received data the authentication information recorded in the IC card or externally output through the network transmission from the PC 3. Only when the user authentication is successful, the conversion controlling portion 17 performs control such that the kana-kanji converting portion 15 can use the externally received copier kana-kanji conversion dictionary data 37 for the conversion. In this case, the conversion controlling portion 17 may perform control such that the externally received copier kana-kanji conversion dictionary data 37 can be read only when the user authentication is successful. It is assumed that the digital copier 1 and the PC 3 can basically store the registration data and the learning data for each user. As a result, the data related to the dictionary (vocabulary) used by the user are prevented from being leaked, and wasteful communication can be avoided.

In the above embodiments, it is preferable that the digital copier 1 and the PC 3 comprise the encrypting/decrypting portions 16, 31 as shown in FIG. 8. The encrypting/decrypting portion on the transmission side encrypts the data 14, 37, 14a, and 15a transmitted and received through the network or the IC card between the digital copier 1 and the PC 3, and the encrypting/decrypting portion on the reception side decrypts the encrypted data.

As a result, the data related to the dictionary (vocabulary) are prevented from being leaked by intercepting the network or the IC card. In fact, to encrypt and exchange the data through the network or the IC card, the encrypting/decrypting process must be coordinated between the digital copier 1 and the PC 3 such as by mutually recognizing keys. For example, the PC 3 may hold a secret key and the digital copier 1 may release a corresponding public key, or a common key may be held in the IC card, etc.

In the above embodiments, the PC 3 preferably comprises an erasing portion that erases the kana-kanji conversion dictionary 14 received from the digital copier 1, the registration data 14a and learning data 15a currently used by the user, and the user information after the dictionary additional information generating portion generates the copier kana-kanji conversion dictionary data 37 for the data. The erasing portion may erase the output copier kana-kanji conversion dictionary data 37 after the dictionary additional information output portion outputs the data to the outside.

Flows of processes including the above embodiments appropriately combined will hereinafter be described. The dictionary creating process (dictionary additional information creating process) executed by the PC 3 will be described with an example, and the kana-kanji conversion dictionary 14 transmitting process and the dictionary additional information (the registration data 14a and the learning data 15a) transmitting process executed by the digital copier 1 are also described. The digital copier 1 initializing process (the dictionary additional information loading process) will then be described with an example.

Figure 9:
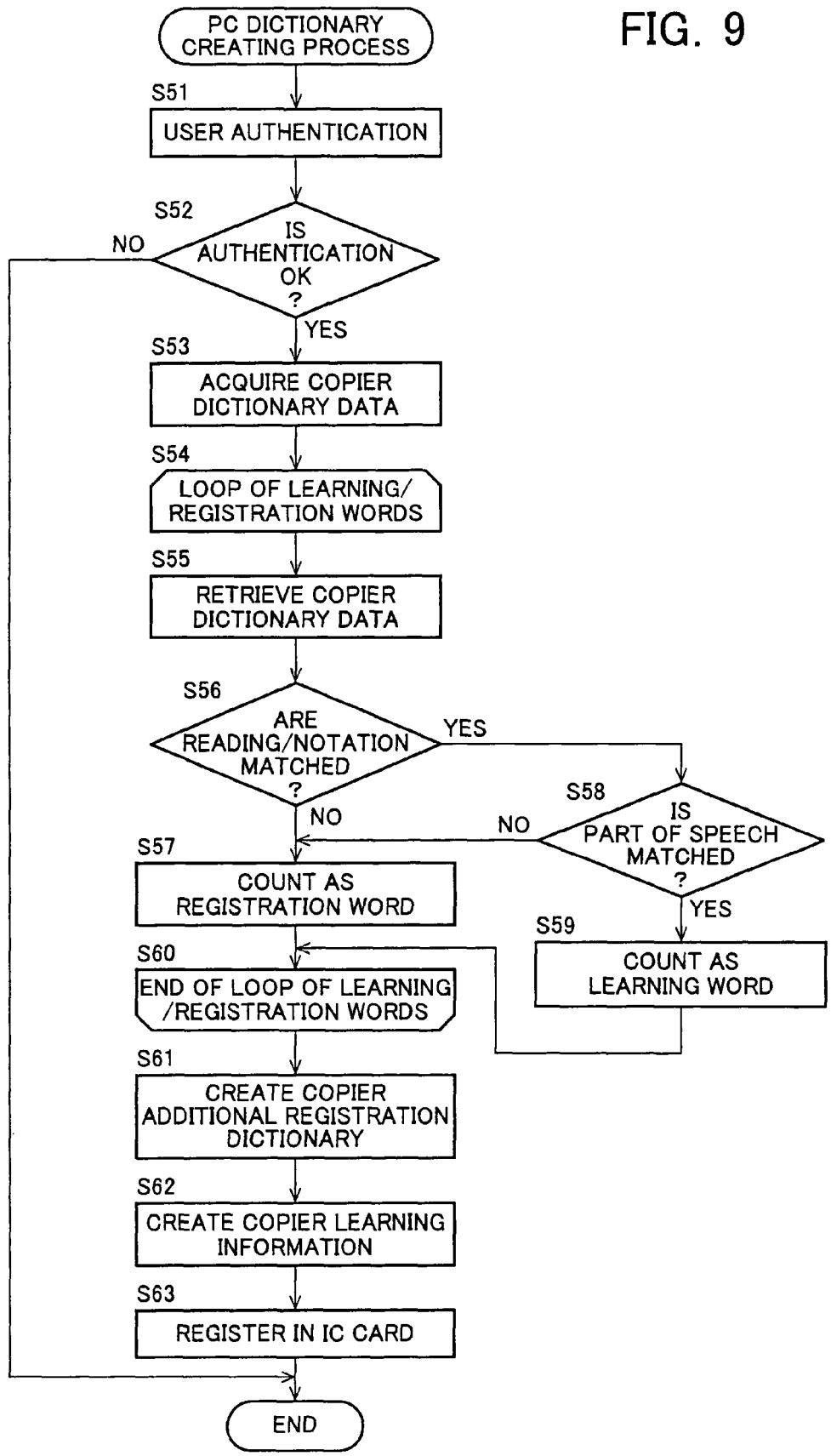
FIG. 9 is an explanatory flow diagram of an example of a dictionary creating process of the PC in the information processing system of FIG. 8.
Figure 10:
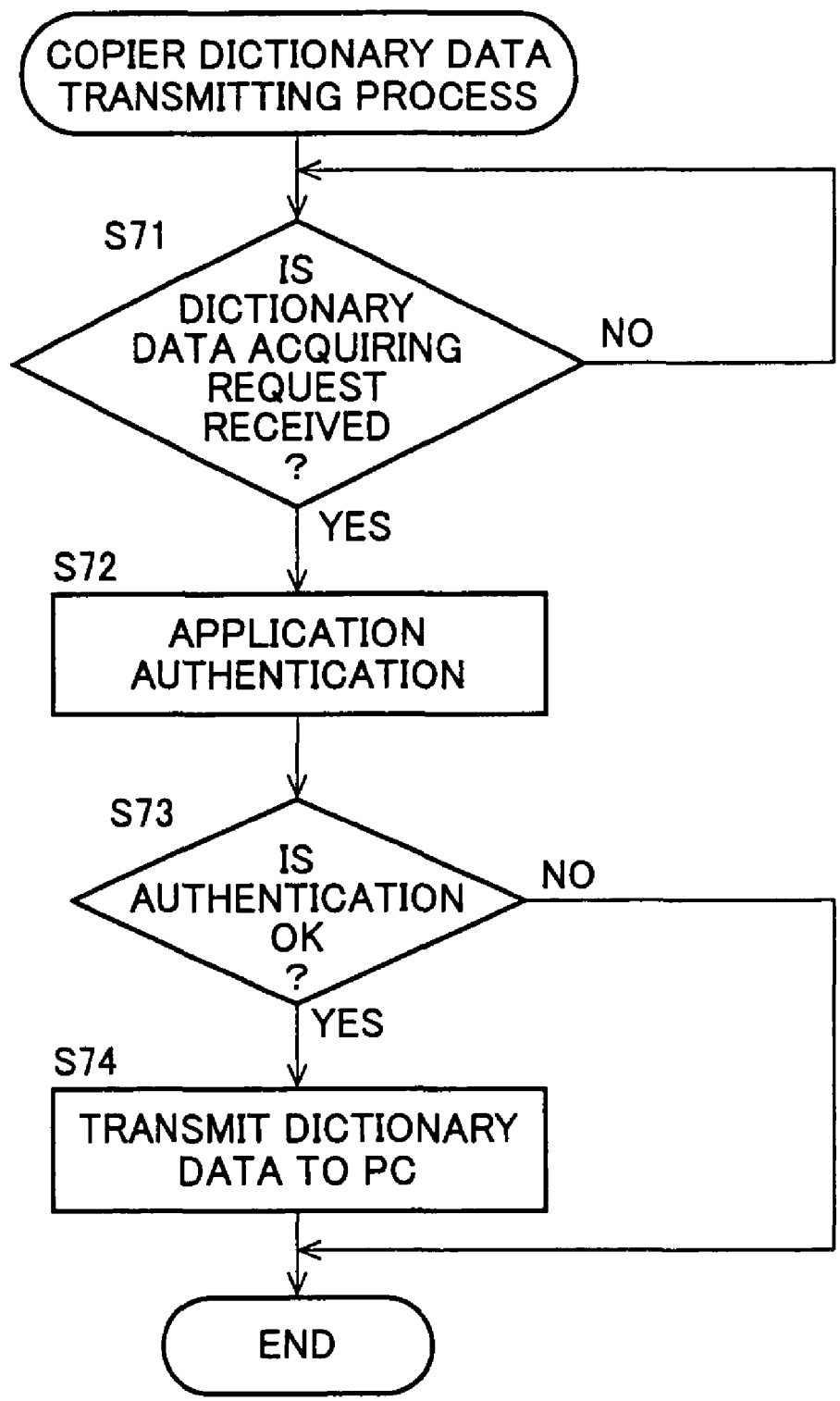
FIG. 10 is an explanatory flow diagram of an example of a kana-kanji dictionary transmitting process of the digital copier in the information processing system of FIG. 8.
Figure 11:
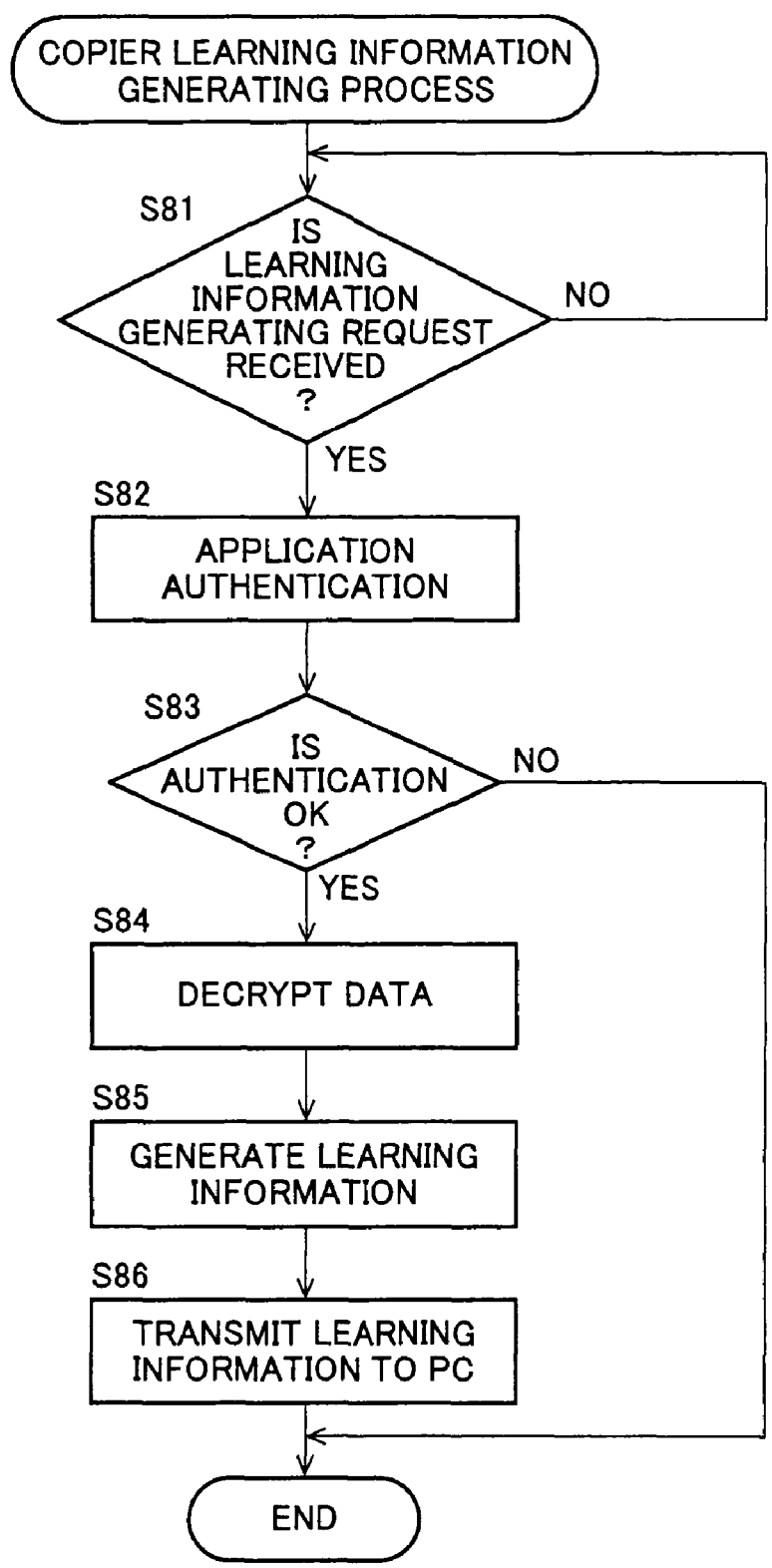
FIG. 11 is an explanatory flow diagram of an example of a dictionary additional information transmitting process of the digital copier in the information processing system of FIG. 8.
Figure 12:
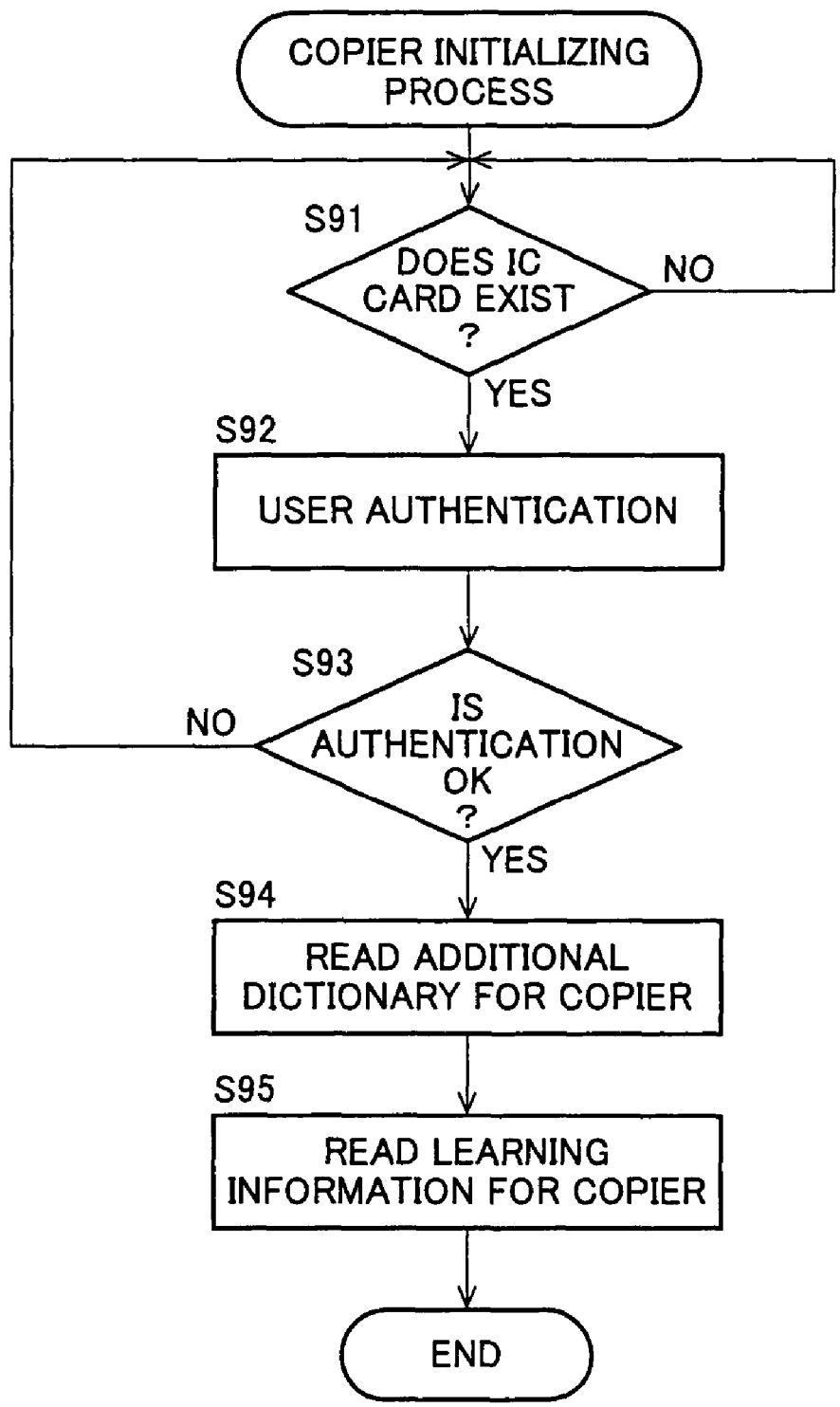
FIG. 12 is an explanatory flow diagram of an example of an initializing process of the digital copier in the information processing system of FIG. 8.

FIG. 9 is an explanatory flow diagram of an example of the dictionary creating process of the PC in the information processing system of FIG. 8; FIG. 10 is an explanatory flow diagram of an example of the kana-kanji dictionary transmitting process of the digital copier in the information processing system of FIG. 8; FIG. 11 is an explanatory flow diagram of an example of a dictionary additional information transmitting process of the digital copier in the information processing system of FIG. 8; and FIG. 12 is an explanatory flow diagram of an example of the initializing process of the digital copier in the information processing system of FIG. 8.

In the dictionary creating process of the PC 3, as shown in FIG. 9, the user authenticating portion 32 performs the user authentication (step S51) and the subsequent process is executed only when the authentication is successful (YES at step S52). The dictionary creating application 38 causes this user authentication to be performed and acquires the dictionary data of the digital copier 1, i.e., the kana-kanji conversion dictionary 14 (and user information) after the authentication (step S53). In this situation, the dictionary data acquiring request is transmitted to the digital copier 1.

The process executed by the digital copier 1 at the time of acquiring the dictionary data at step S53 will be described with reference to FIG. 10. The conversion controlling portion 17 determines whether the dictionary data acquiring request is received through the network from the PC 3 (step S71) and the subsequent process is executed only when the request is received. To enable action to be taken from the digital copier 1, a process is added to determine whether the dictionary data updating request is accepted through the user operation in addition to step S71.

The PC checking portion of the conversion controlling portion 17 uses the received dictionary data acquiring request to authenticate that the application used for creating the request is the dictionary creating application 38 (step S72), and only when the authentication is successful (YES at step S73), the conversion controlling portion 17 reads the dictionary data (such as the kana-kanji conversion dictionary 14) and transmits the dictionary data to the PC 3 through the network I/F 24.

Referring to FIG. 9 again, the dictionary creating application 38 executes a loop of learning/registration words included between step S54 and step S60 after step S53. First, a word is retrieved from the received dictionary data (step S55), and it is determined whether the reading and notation are matched with the registration data 34a and the learning data 35a (step S56). If not matched, the word does not exist in the digital copier 1, and the word is counted as a registration word (step S57). On the other hand, if reading and notation are matched at step S56, it is determined whether the part of speech is matched (step S58); if the part of speech is matched, the word is counted as a learning word (step S59); and if the part of speech is not matched, the word is counted as a registration word (step S57).

The above loop is executed for all the registration data 34a and the learning data 35a, and when the loop is completed, the dictionary creating application 38 generates the copier kana-kanji conversion dictionary data 37 (step S61). The copier kana-kanji conversion dictionary data 37 are generated as the registration data 14a for the word counted as the registration word at step S57 and are generated as the learning data 15a for the word counted as the learning word at step S59.

The dictionary creating application 38 creates the copier learning information to make the copier kana-kanji conversion dictionary data 37 into data that can be added to the digital copier 1 (step S62). Since learning steps are generally not published, the process at step S62 must often be executed by the digital copier 1 rather than the PC 3. Therefore, at step S62, the learning information generating request is transmitted to the receiving digital copier 1 along with the encrypted version of the learning information to be generated.

The process executed by the digital copier 1 at the time of generating the learning information at step S62 will be described with reference to FIG. 11. First, the conversion controlling portion 17 determines whether the learning information generating request is received through the network from the PC 3 (step S81) and the subsequent process is executed only when the request is received. To enable action to be taken from the digital copier 1, a process is added to determine whether the learning information generating request is accepted through the user operation in addition to step S81.

The PC checking portion of the conversion controlling portion 17 authenticates the dictionary creating application 38 (steps S82 and S83) as is the case with steps S72 and S73, and only when the authentication is successful (YES at step S83), the conversion controlling portion 17 decrypts the data received together with the learning information generating request (step S84) and generates the learning data 15a for the kana-kanji converting portion 15 based on the learning information (step S85). The learning information (in this case, the learning data 15*a*) generated at step S85 is transmitted to the PC 3 through the network I/F 24 (step S86).

Referring to FIG. 9 again, the dictionary creating application 38 receives the learning data 15*a* transmitted at step S86 through the network I/F 41 and drives the IC card writer 46 to write into the IC card the received learning data 15*a* and the registration data 14*a* created at step S61 as the copier kana-kanji conversion dictionary data 37 along with the user information (step S63). The process of the PC 3 is completed.

The user pulls out the IC card having the copier kana-kanji conversion dictionary data 37 written by the PC 3 and inserts the IC card into the IC card reader of the user information input portion 25 of the digital copier 1. Referring to FIG. 12, the conversion controlling portion 17 determines whether the IC card exists (step S91) and the subsequent process is executed only when the IC card exists. First, the user authenticating portion 19 reads and compares the user information from the IC card with the preliminarily stored user information 18 to perform the user authentication (step S92). The conversion controlling portion 17 judges the result of the authentication in the user authenticating portion 19 (step S93) and executes next steps S94 and S95 only when the authentication is successful.

At step S94, the conversion controlling portion 17 reads from the IC card the additional dictionary (the registration data 14*a*) among the copier kana-kanji conversion dictionary data 37 and adds or writes the read data to or over the registration data 14*a* in the controlling portion 10 for updating. At step S95, the conversion controlling portion 17 reads from the IC card the learning information (the learning data 15*a*) among the copier kana-kanji conversion dictionary data 37 and adds or writes the read data to or over the learning data 15*a* in the controlling portion 10 for updating. The registration data 14*a* and the learning data 15*a* for each user are correlated with each user and stored in the user information 18 of the digital copier 1, and the updating at steps S94 and S95 is performed for data of a target user.

By performing such initialization of the digital copier 1 (initialization of the Japanese-language converting portion), the registration words and learning contents of the PC 3 usually used by the user can be reflected in the digital copier 1, and the same Japanese-language conversion results as the PC 3 can be acquired in the digital copier 1.

Although the present invention has been described as above, distribution of programs will complementarily be described. The digital copier side program and/or the PC side program according to the present invention described in FIGS. 8 and 2 may be stored into and distributed through a computer readable recording medium along with data such as dictionaries as needed or may be distributed through the network. Specifically, it can be assumed that such a recording medium can be CD-ROM, magnetic optical disk, DVD-ROM, FD, flash memory, and other various ROMs and RAMs. The above programs are recorded into and distributed through the recording medium to facilitate implementation of the functions according to the present invention.

For example, the digital copier program can executably be stored in the digital copier by mounting the above recording medium on the PC, etc., to read and transfer the digital copier program to the controlling portion of the digital copier, or by mounting the above recording medium on the digital copier to read and transfer the digital copier program to the internal controlling portion. The PC program can executably be stored in the PC by mounting the above recording medium on the PC to read and transfer the PC program with the PC to the controlling portion of the PC. The functions according to the present invention can be executed by reading the programs when needed as described above with reference to FIGS. 8 and 2.

As described above with reference to FIGS. 2 and 8 to 12, according to the present invention, even in the case of an information processing apparatus different from a computer usually used by a user, the dictionary additional information of kana-kanji conversion can be created for the information processing apparatus such that the same kana-kanji conversion candidates as the computer can be acquired without unifying Japanese-language converting programs and unifying usage environments.

The invention claimed is:

1. An information processing apparatus connected to a computer through a network, the computer comprising a computer Japanese-language converting portion that receives a character string from the information processing apparatus through the network to return conversion candidates, the information processing apparatus comprising:

a user interface portion that deals with character input from a user and display for a user;

a main-body Japanese-language converting portion that receives a character string input from the user interface portion to return conversion candidates;

a conversion controlling portion that controls interaction between the user interface portion and the computer Japanese-language converting portion as well as the main-body Japanese-language converting portion; and a computer identifying portion that identifies the computer corresponding to a user currently using the information processing apparatus, the conversion controlling portion sending the character string input with the user interface portion to the computer Japanese-language converting portion of the computer identified by the computer identifying portion or to the computer Japanese-language converting portion and the main-body Japanese-language converting portion for conversion, the conversion controlling portion sending the conversion candidates to the user interface portion for display.

2. The information processing apparatus as defined in claim 1, wherein after the conversion controlling portion sends the character string input with the user interface portion to the main-body Japanese-language converting portion for conversion and sends the conversion candidates to the user interface portion for display, the conversion controlling portion sends the character string input with the user interface portion to the computer Japanese-language converting portion through the network for conversion in accordance with a user instruction input from the user interface portion and receives through the network and sends the conversion candidates to the user interface portion for display.

3. The information processing apparatus as defined in claim 1, wherein the conversion controlling portion sequentially sends the character string input with the user interface portion through the network to the computer Japanese-language converting portion for conversion each time one character is input and sequentially receives through the network and sends the conversion candidates to the user interface portion for display and wherein when receiving an input character from the information processing apparatus, if the computer Japanese-language converting portion is in process of converting the previously received character string, the converting process is terminated to start the conversion of the character string having added thereto the input character received this time.

4. The information processing apparatus as defined in claim 1, wherein the conversion controlling portion confirms through the network the operation of the computer Japanese-language converting portion in the computer identified by the computer identifying portion and wherein if the operation of the computer Japanese-language converting portion cannot be confirmed, the conversion controlling portion sends the character string input with the user interface portion only to the main-body Japanese-language converting portion for conversion and sends the conversion candidates to the user interface portion for display.

5. The information processing apparatus as defined in claim 1, wherein the information processing apparatus and/or the computer comprise the user authenticating portions and wherein in case the user authenticating portion fails to authenticate a user, the conversion controlling portion sends the character string input with the user interface portion only to the main-body Japanese-language converting portion for conversion and sends the conversion candidates to the user interface portion for display.

6. The information processing apparatus as defined in claim 1, wherein the information processing apparatus and the computer comprise an encryption/decryption processing portion to encrypt the character string and conversion candidates transmitted and received through the network between the information processing apparatus and the computer with the encryption/decryption processing portion on the transmission side and to decrypt the encrypted character string or conversion candidates with the encryption/decryption processing portion on the reception side.

7. An information processing system comprising the information processing apparatus as defined in any one of claims 1 to 6 and the computer connected to the information processing apparatus.

8. The information processing apparatus as defined in any one of claims 1 to 6, wherein a program embodied in a non-transitory computer-readable medium is incorporated into a computer connected through a network to the information processing apparatus, the program causing the computer to execute the step of receiving only the character string input with the information processing apparatus from the information processing apparatus through the network and returning conversion candidates to the information processing apparatus after Japanese-language conversion.

9. An information processing method of performing an information process while an information processing apparatus accesses a computer connected to the information processing apparatus through a network, the method comprising:
   an input step of accepting character input from a user by a user interface portion of the information processing apparatus;
   a display step of displaying the character string input at the input step for the user by the user interface portion;
   a Japanese-language converting step of receiving the character string input at the input step to return conversion candidates by a Japanese-language converting portion of the information processing apparatus;
   a conversion controlling step of controlling interaction between the user interface portion and the Japanese-language converting portion of the information processing apparatus as well as the Japanese-language converting portion of the computer by a conversion controlling portion;
   a computer identifying step of identifying the computer corresponding to a user currently using the information processing apparatus by a computer identifying portion; and
   a computer Japanese-language converting step of receiving the character string from the information processing apparatus through the network to return conversion candidates by the Japanese-language converting portion of the computer, the conversion controlling step being a step of sending the character string input with the user interface portion to the computer Japanese-language converting portion of the computer identified at the computer identifying step or to the computer Japanese-language converting portion and the information processing apparatus Japanese-language converting portion for conversion to send the conversion candidates to the user interface portion for display.

10. A program embodied in a non-transitory computer-readable recording medium to be incorporated into an information processing apparatus connected to a computer through a network, the information processing apparatus comprising:
   a user interface portion that deals with character input from a user and display for a user; and
   a controlling portion that controls the user interface portion, the program causing the controlling portion to execute
   a computer identifying step of identifying the computer corresponding to the user currently using the information processing apparatus;
   a converting step consisting of a computer Japanese-language converting step of transmitting a character string input with the user interface portion to the identified computer through the network to receive conversion candidates from the computer or consisting of the computer Japanese-language converting step and an information processing apparatus Japanese-language converting step of receiving the character string input with the user interface portion to return the conversion candidates; and
   a result displaying step of sending to the user interface portion and displaying the conversion candidates that are acquired by executing the converting step consisting of the computer Japanese-language converting step or the computer Japanese-language converting step and the information processing apparatus Japanese-language converting step for the character string input with the user interface portion.

11. The program as defined in claim 10, wherein at the converting step, after executing the information processing apparatus Japanese-language converting step to convert the character string input with the user interface portion and to send the conversion conversion candidates to the user interface portion for display, the computer Japanese-language converting step is executed in accordance with a user instruction input from the user interface portion to send the character string input with the user interface portion through the network for conversion and to receive through the network and sends the conversion candidates to the user interface portion for display.

12. The program as defined in claim 10, wherein at the converting step, the computer Japanese-language converting step is executed to sequentially send the character string input with the user interface portion through the network for conversion each time one character is input and to sequentially receive through the network and send the conversion candidates to the user interface portion for display and wherein at the computer Japanese-language converting step, when receiving an input character from the information processing apparatus, if the computer is in process of converting the previously received character string, the converting process is terminated to start the conversion of the character string having added thereto the input character received this time and the resulting conversion candidates are received from the computer.

13. The program as defined in any one of claims 10 to 12, wherein at the converting step, it is confirmed through the network that the computer Japanese-language converting step can be executed in the computer identified at the computer identifying step and wherein if the computer Japanese-language converting step cannot be executed, only the information processing apparatus Japanese-language converting step is executed to send the character string input with the user interface portion for conversion and to send the conversion candidates to the user interface portion for display.

14. The program as defined in any one of claims 10 to 12, wherein the converting step includes a user authenticating step of performing user authentication by the information processing apparatus and/or the computer and wherein in case a user fails to be authenticated at the user authenticating step, only the information processing apparatus Japanese-language converting step is executed to send the character string input with the user interface portion for conversion and to send the conversion candidates to the user interface portion for display.

15. An information processing system comprising:
an information processing apparatus and a computer connected to the information processing apparatus through a network, the information processing apparatus comprising
a first Japanese-language converting portion that uses a first normal dictionary and first dictionary additional information to convert characters input through user operation and a controlling portion that performs control of transmitting the first normal dictionary to the computer through the network and control of externally receiving the first dictionary additional information as the response thereto, the computer comprising a second Japanese-language converting portion that uses a second normal dictionary and a second dictionary additional information to convert characters input through user operation, a dictionary additional information generating portion that uses the first normal dictionary and the second dictionary additional information to generate the first dictionary additional information for the first normal dictionary received from the information processing apparatus through the network, and a dictionary additional information output portion that outputs the first dictionary additional information generated by the dictionary additional information generating portion.

16. The information processing system as defined in claim 15, wherein the information processing apparatus comprises a storage medium reading portion that reads data from a portable storage medium, wherein the dictionary additional information output portion includes a storage medium writing portion that writes the first dictionary additional information into the storage medium, and wherein the controlling portion performs control of causing the first Japanese-language converting portion to use the first normal dictionary and the first dictionary additional information read from the storage medium with the storage medium reading portion to perform the conversion.

17. The information processing system as defined in claim 15, wherein the dictionary additional information output portion includes a transmitting portion that transmits the first dictionary additional information through the network to the information processing apparatus that receives the first normal dictionary, and wherein the controlling portion performs control of causing the first Japanese-language converting portion to use the first normal dictionary and the first dictionary additional information transmitted by the transmitting portion to perform the conversion.

18. The information processing system as defined in claim 15, wherein the first dictionary additional information and the second dictionary additional information are information of registration words and/or learning contents.

19. The information processing system as defined in claim 15, wherein the information processing apparatus comprises a computer checking portion that checks whether the dictionary additional information generating portion exists in the computer, and wherein only when the dictionary additional information generating portion exists, the controlling portion performs control of transmitting the first normal dictionary to the computer through the network.

20. The information processing system as defined in claim 15, wherein the information processing apparatus comprises a user authenticating portion, wherein the dictionary additional information output portion outputs the first dictionary additional information generated by the dictionary additional information generating portion along with user information related to a user permitted to use the first dictionary additional information, and wherein only when the user authenticating portion can authenticate the user, the controlling portion performs control of enabling the conversion in the first Japanese-language converting portion with the use of the externally received first dictionary additional information.

21. The information processing system as defined in claim 15, wherein the information processing apparatus and the computer include an encryption/decryption processing portion respectively, wherein the first normal dictionary transmitted/received between the information processing apparatus and the computer is encrypted by the encryption/decryption processing portion of the information processing apparatus, and wherein the encrypted first normal dictionary is decrypted by the encryption/decryption processing portion of the computer.

22. The information processing system as defined in claim 15, wherein the computer comprises an erasing portion that erases the first normal dictionary received from the information processing apparatus after the dictionary additional information generating portion generates the first dictionary additional information for the first normal dictionary.

23. The information processing system as defined in claim 15, wherein the dictionary additional information generating portion requests the information processing apparatus through the network to partially generate the first dictionary additional information, and when the request is received, the controlling portion causes the first Japanese-language converting portion to generate the first dictionary additional information based on data included in the received request.

24. The information processing system as defined in claim 15, wherein the controlling portion performs control of transmitting the current first dictionary additional information to the computer through the network along with the first normal dictionary, and wherein the dictionary additional information generating portion uses the first normal dictionary, the first dictionary additional information, and the second dictionary additional information to generate new first dictionary additional information for the first normal dictionary and the first dictionary additional information received from the information processing apparatus through the network.

25. A computer included in the information processing system as defined in any one of claims 15 to 24.

26. An information processing apparatus included in the information processing system as defined in any one of claims 15 to 24.

27. An information processing method of performing an information process by a computer and an information processing apparatus connected to the computer through a network, the method comprising:
- a first Japanese-language converting step of using a first normal dictionary and first dictionary additional information to convert characters input through user operation by a Japanese-language converting portion of the information processing apparatus;
- a step of performing control of transmitting the first normal dictionary to the computer through the network by the controlling portion of the information processing apparatus;
- a step of performing control of externally receiving the first dictionary additional information as the response thereto by the controlling portion;
- a second Japanese-language converting step of using a second normal dictionary and second dictionary additional information to convert characters input through user operation by the Japanese-language converting portion of the computer;
- a dictionary additional information generating step of using the first normal dictionary and the second dictionary additional information by a dictionary additional information generating portion to generate the first dictionary additional information for the first normal dictionary received from the information processing apparatus through the network; and
- a dictionary additional information output step of outputting the generated first dictionary additional information by a dictionary additional information output portion.

* * * * *

UNITED STATES PATENT AND TRADEMARK OFFICE
CERTIFICATE OF CORRECTION

PATENT NO. : 7,899,664 B2
APPLICATION NO. : 11/804666
DATED : March 1, 2011
INVENTOR(S) : Hiroyuki Ishikura et al.

Page 1 of 1

It is certified that error appears in the above-identified patent and that said Letters Patent is hereby corrected as shown below:

Title Page, Item (22) should read

(22)   Filed:   May 18, 2007

Signed and Sealed this
Twenty-fourth Day of April, 2012

David J. Kappos
*Director of the United States Patent and Trademark Office*